United States Patent
Smid et al.

(10) Patent No.: US 10,288,065 B1
(45) Date of Patent: *May 14, 2019

(54) MUD MOTOR COUPLING SYSTEM

(71) Applicants: John P. Smid, Cypress, TX (US); Trent A. Geraci, Houston, TX (US); Robert H. Wittman, Houston, TX (US)

(72) Inventors: John P. Smid, Cypress, TX (US); Trent A. Geraci, Houston, TX (US); Robert H. Wittman, Houston, TX (US)

(73) Assignee: National Oilwell DHT, LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/355,681

(22) Filed: Nov. 18, 2016

Related U.S. Application Data

(63) Continuation-in-part of application No. 15/179,571, filed on Jun. 10, 2016.

(Continued)

(51) Int. Cl.
| | |
|---|---|
| *E21B 4/02* | (2006.01) |
| *F16D 3/10* | (2006.01) |
| *F16D 3/16* | (2006.01) |
| *F16D 3/32* | (2006.01) |
| *F16D 3/38* | (2006.01) |
| *F16D 3/40* | (2006.01) |
| *F04C 15/00* | (2006.01) |
| *F04C 2/107* | (2006.01) |
| *F04C 29/00* | (2006.01) |
| *F16D 3/205* | (2006.01) |
| *E21B 17/046* | (2006.01) |

(52) U.S. Cl.
CPC ............ *F04C 15/0073* (2013.01); *E21B 4/02* (2013.01); *E21B 17/046* (2013.01); *F04C 2/1073* (2013.01); *F04C 15/0061* (2013.01); *F04C 15/0076* (2013.01); *F04C 29/005* (2013.01); *F04C 29/0071* (2013.01); *F04C 29/0078* (2013.01); *F16D 3/10* (2013.01); *F16D 3/16* (2013.01); *F16D 3/205* (2013.01); *F16D 3/2055* (2013.01); *F16D 3/32* (2013.01); *F16D 3/38* (2013.01); *F16D 3/40* (2013.01)

(58) Field of Classification Search
CPC .......................... F04C 2/1071; F04C 15/0061; F04C 15/0073; F04C 15/0076; F04C 29/005; F04C 29/0071; F04C 29/0078; F16D 3/16; F16D 3/205; F16D 3/2052; F16D 3/2055; F16D 3/32; F16D 3/38; F16D 3/40

See application file for complete search history.

(56) References Cited

U.S. PATENT DOCUMENTS 3,212,290 A * 10/1965 Walden ..................... F16D 3/38
174/138 D
3,539,279 A * 11/1970 Rider .................. F04C 15/0076
418/48

(Continued)

*Primary Examiner* — Mary Davis
(74) *Attorney, Agent, or Firm* — Phillips Murrah PC; Martin G. Ozinga

(57) ABSTRACT

The present invention is an apparatus, system and method for use of a mud motor having a bearing assembly, a transmission having torque and thrust transfer couplings with a catch pin interface, a power section, a rotor catch assembly, and a cross over sub-valve.

10 Claims, 21 Drawing Sheets

Related U.S. Application Data

(60) Provisional application No. 62/174,711, filed on Jun. 12, 2015.

(56) References Cited

U.S. PATENT DOCUMENTS

| | | | | |
|---|---|---|---|---|
| 3,800,555 A * | 4/1974 | Arneson | ................... | F16D 3/00 |
| | | | | 464/114 |
| 5,205,789 A * | 4/1993 | Falgout, Sr. | .............. | F16D 3/16 |
| | | | | 403/348 |
| 5,288,271 A * | 2/1994 | Nelson | ...................... | E21B 4/02 |
| | | | | 464/114 |
| 9,664,237 B2 * | 5/2017 | Bodtker | .................. | F16D 3/385 |
| 2014/0224545 A1 * | 8/2014 | Nicol-Seto | ................ | E21B 4/02 |
| | | | | 175/107 |
| 2015/0014059 A1 * | 1/2015 | Perry | ........................ | E21B 4/02 |
| | | | | 175/57 |
| 2015/0167399 A1 | 6/2015 | Kuhn et al. | | |

* cited by examiner

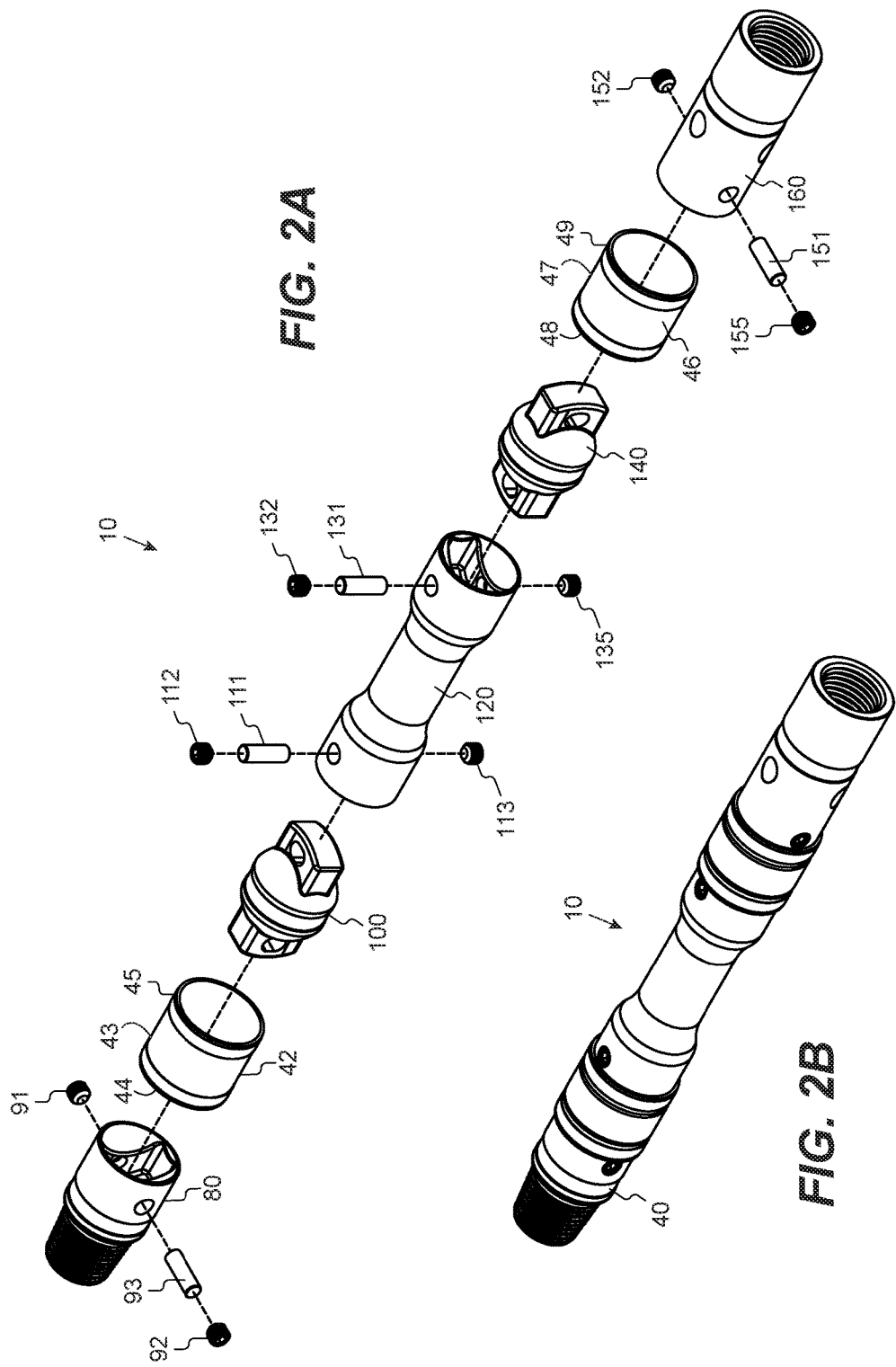

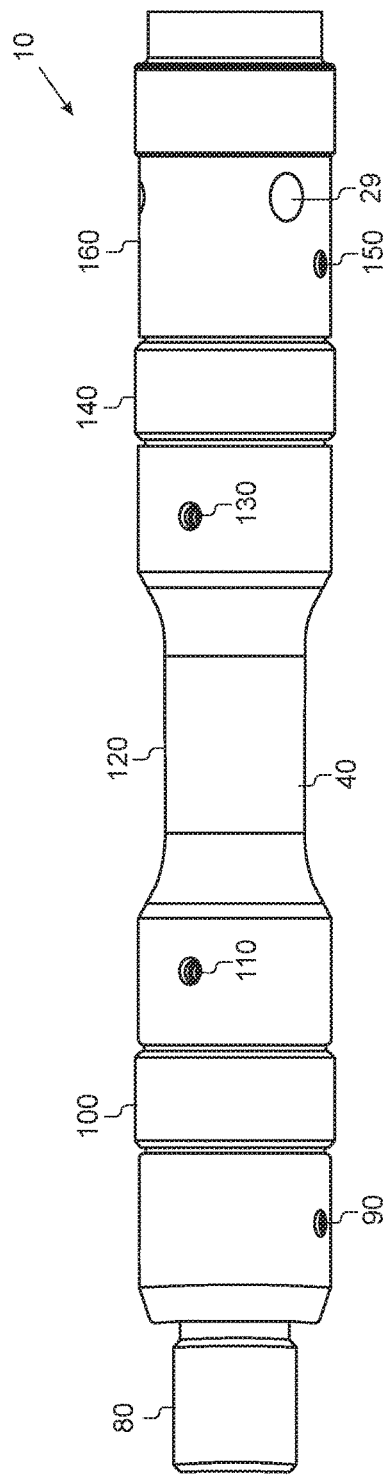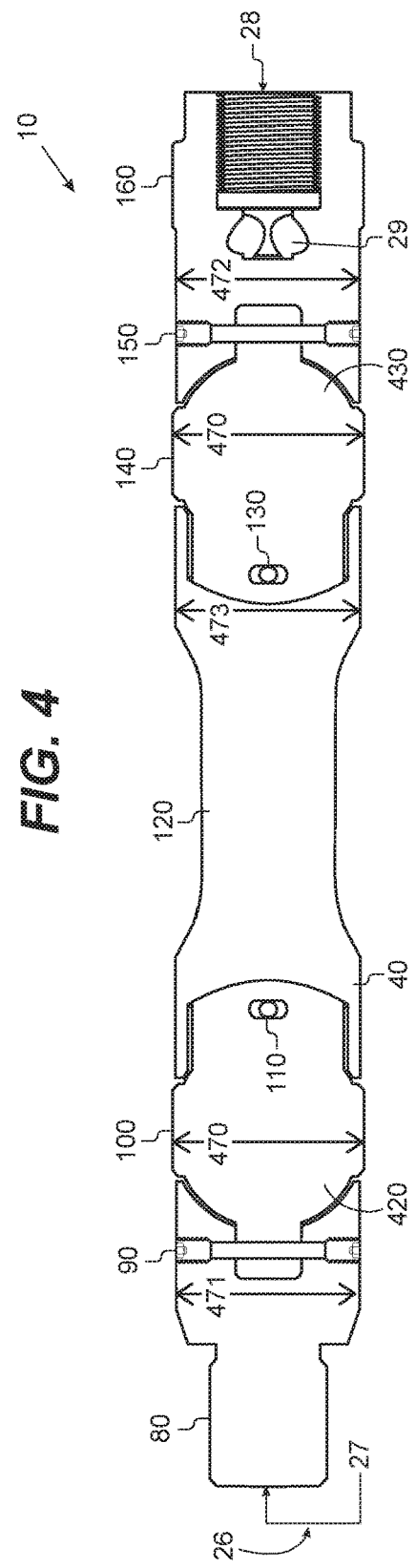

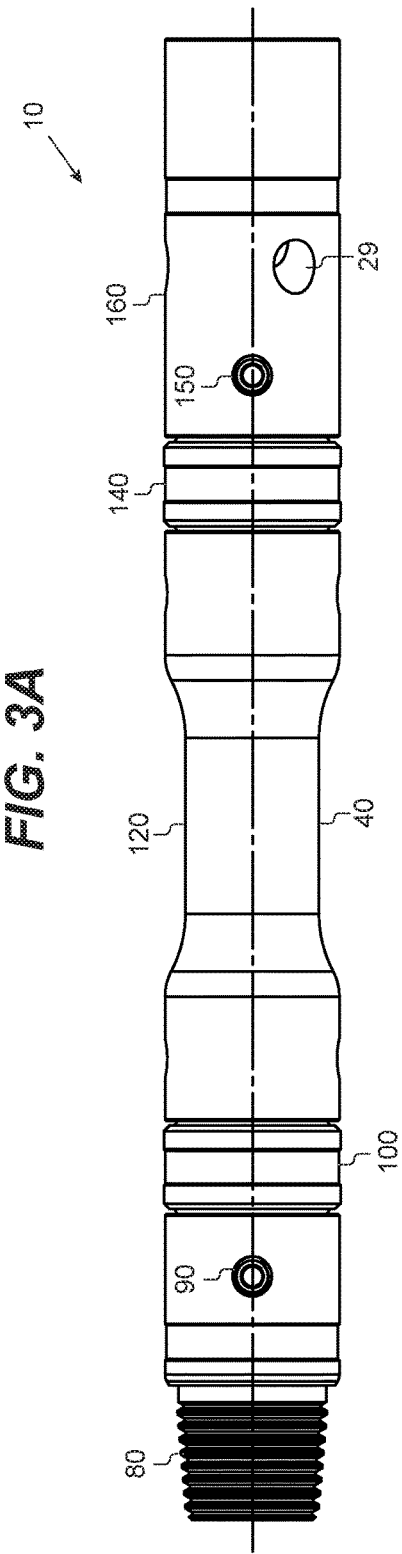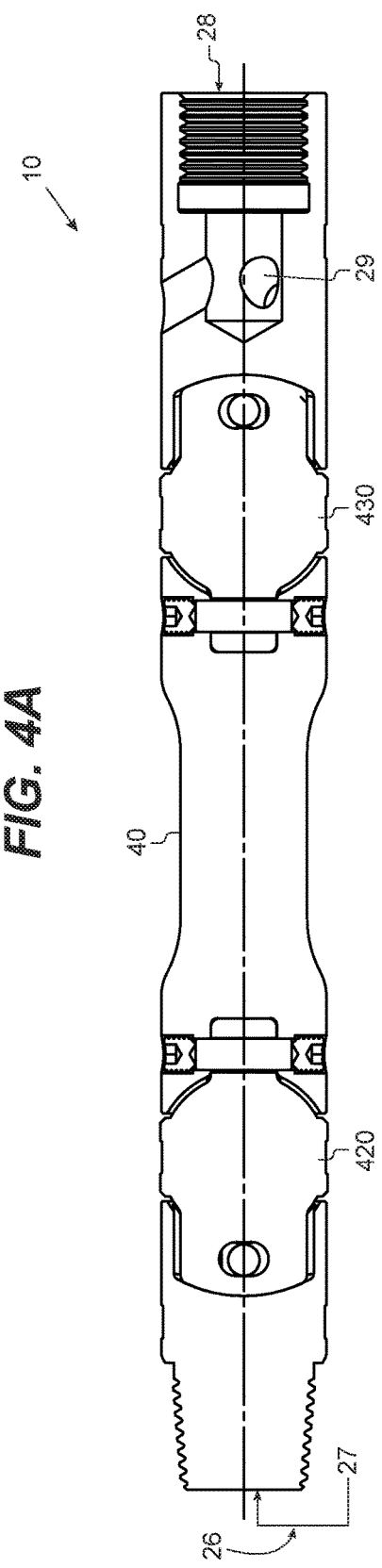

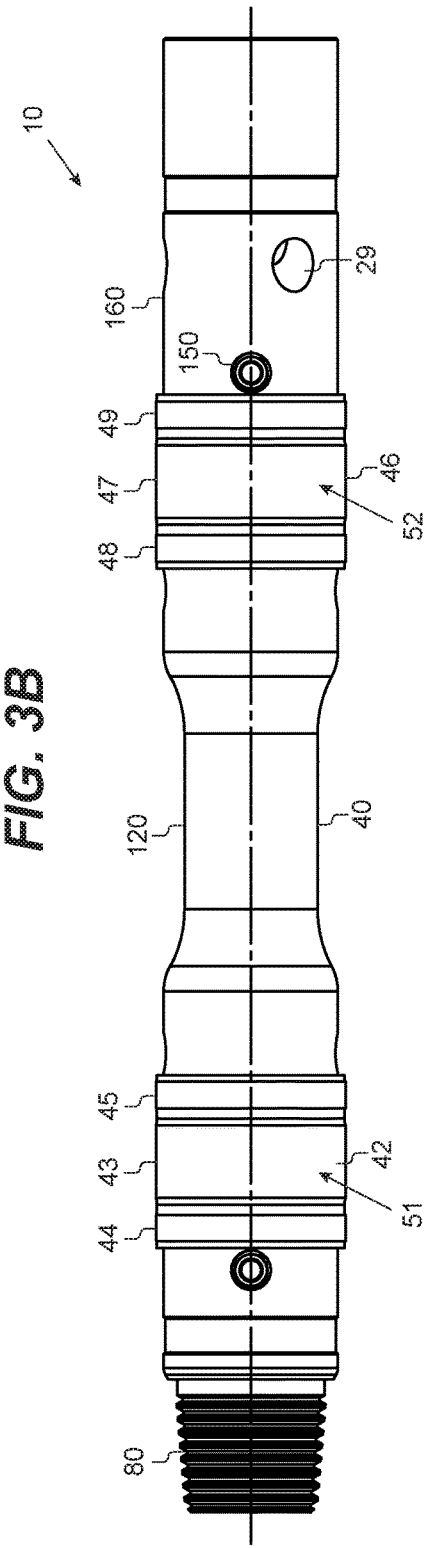
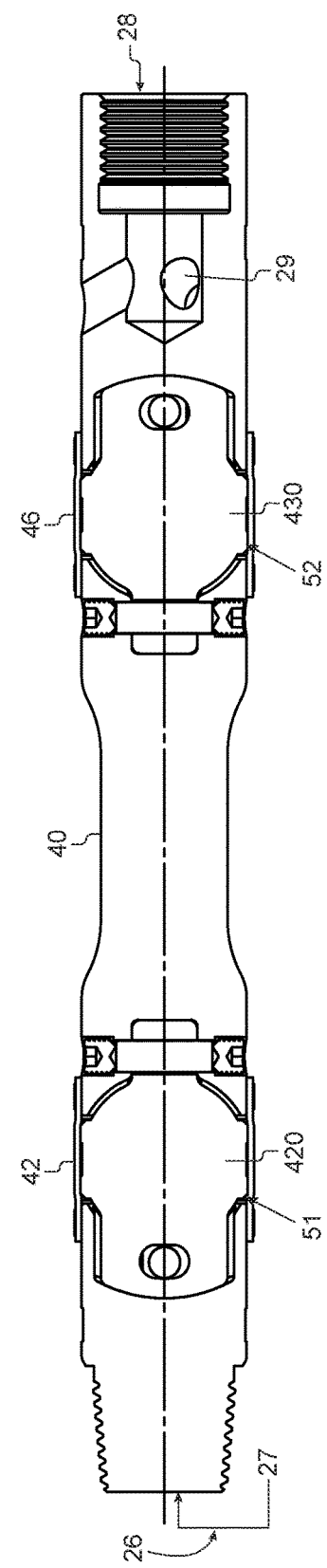
FIG. 3B
FIG. 4B

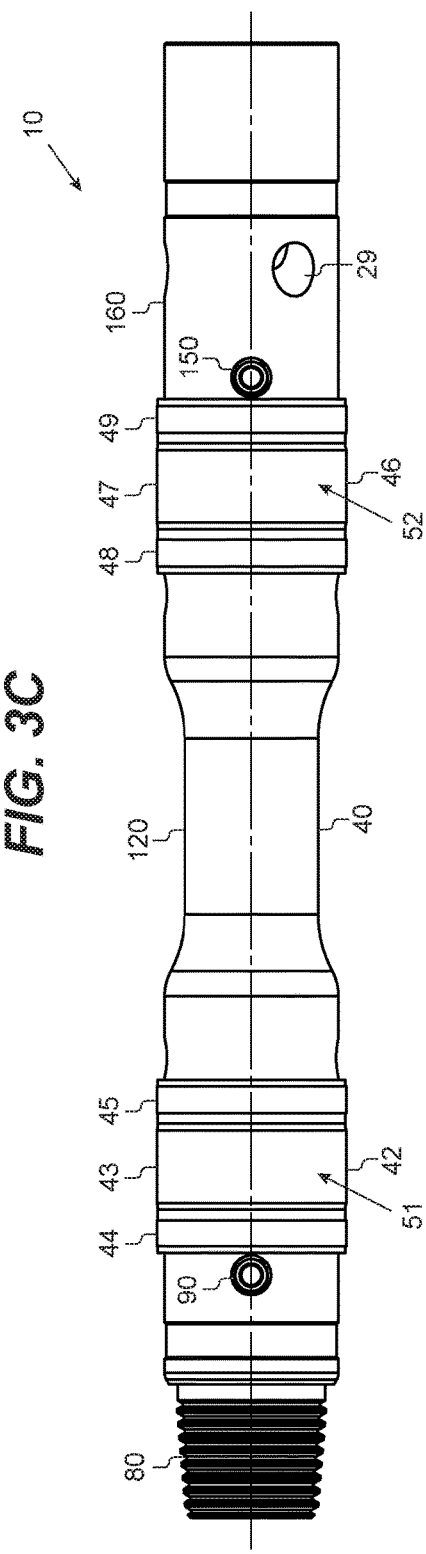
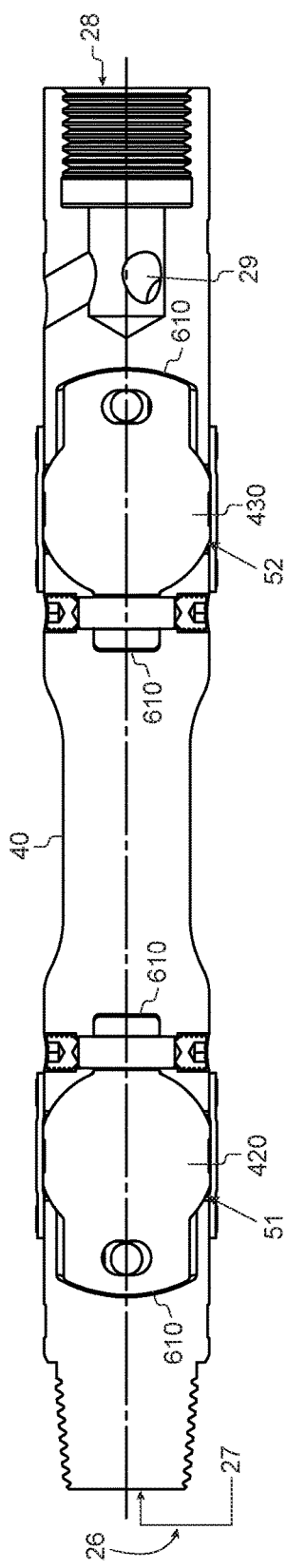
FIG. 3C
FIG. 4C

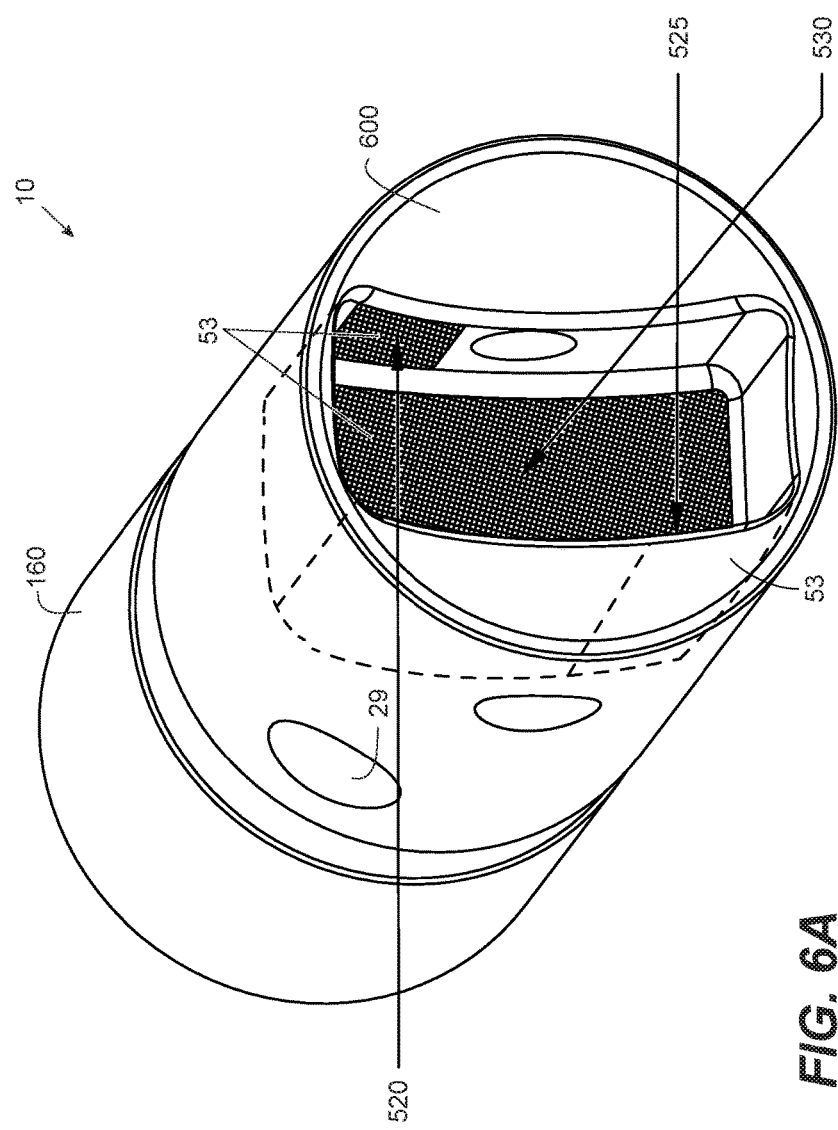

MUD MOTOR COUPLING SYSTEM

CROSS-REFERENCE TO RELATED APPLICATIONS

The present patent application is a continuation-in-part of U.S. patent application Ser. No. 15/179,571, filed on Jun. 10, 2016, wherein priority is claimed from U.S. Provisional Patent Application Ser. No. 62/174,711 filed on Jun. 12, 2015 and incorporated by referenced herein.

BACKGROUND OF INVENTION

1. Field of the Invention

In general, the present invention relates to a device, system and method of using a new and improved mud motor. More particularly, the present invention provides a mud motor with a transmission having a torque and thrust transfer couplings with a catch pin interface.

2. Description of the Prior Art

A mud motor or drilling motor is typically a progressive cavity positive displacement motor placed in the drill string to provide additional power to the bit while drilling or rotate the drill bit while the drill string is sliding. Mud motors are frequently utilized in directional drilling applications in horizontal wells, but they are also utilized in straight vertical wells where increased performance is desired.

As the desired drill bit motion is purely rotational, a transmission is required to convert the rotation and translation of the mud motor power section rotor to pure rotation at the bit. The motor uses drilling fluid commonly referred to as drilling mud or just mud to create rotating and translating eccentric motion in the power section of the motor, which is transferred as rotating power to the drill bit. In other words, as fluid is driven by different pressure through the power section of a mud motor, the rotor spins but also translates as the rotor lobes move from one stator cavity to the next.

Because of the curves needed to be built in directional drilling, the transmission in the mud motor must feature a bend angle in its assembly. This bend angle causes a misalignment of the drill bit axis that must be accommodated by the mud motor transmission, which must also accommodate the translation of the power section rotor. Current transmission designs that allow for some degree of bending, generally fall into three categories, a constant velocity, also referred to as a CV joint, jaw clutch coupling, and flex shafts.

Constant velocity joint transmissions very generally utilize cylindrical pockets in the coupling that create the female portion of the coupling interface. Spherical pockets in the shaft hold the balls. The balls allow torque between the coupling and shaft. The spherical thrust reaction interface allows the shaft to rock back and forth relative to the coupling while both rotate together. To complete the assembly, this same coupling to shaft interface is found at each end of the shaft. An advantage is that they may be smooth running and generally an efficient torque transfer. However, a weakness and or limitation are that the point and line contact interfaces that generate high stresses in the joint, resulting in wear and damage to the joint integrity.

Jaw clutch couplings generally provide enough clearance at this interface to allow a three-degree misalignment between the sides of the coupling interface. With enough play between the parts, the input end can rotate and translate with the power section and the output end can simply rotate. An advantage may be that they are simple, easily repaired, and have higher damage tolerance. A weakness and or limitation are that they exhibit clunky operations and the point and line contacts generate high stresses in the joint.

The flex shaft coupling relies upon a long shaft. If it is long enough and made from high strength and low elastic modulus material, it can withstand up to a three-degree misalignment between the input and output and rotate and translate with the power section while keeping stresses low. Since the motion of the power section is a given deflection input, the design principle here is reducing the bending stiffness of a deflecting member to reduce the stress in the deflecting member such that it can survive fatigue loading for an adequate length of time. An advantage may be that they run smooth and are the simplest assembly. A weakness and or limitation are that the shafts must be long to manage fatigue. Furthermore, expensive exotic materials such as titanium are often used and shafts are still prone to failure in bending fatigue.

The current mud motor transmissions on the market have known torque transfer and life limitations, which limits the drilling industry. Prior art attempts at improvements to this problem have not provided the desired solutions. Thus, there is a need for an apparatus, process and or system that provides a new mud motor with an improved transmission. The above discussed limitations in the prior art is not exhaustive. The current invention provides a cost competitive, time saving, more reliable apparatus, method and system where the prior art fails.

SUMMARY OF THE INVENTION

In view of the foregoing disadvantages inherent in the known types of mud motor transmissions now present in the prior art, the present invention provides a new and improved apparatus, system and method of using the same. As such, the general purpose of the present invention, which will be described subsequently in greater detail, is to provide a new and improved mud motor and mud motor transmission, which has all the advantages of high torque, thrust load, constant velocity universal joints of the prior art devices and none and or fewer of the disadvantages.

It is, therefore, contemplated that the present invention is an apparatus, system and method for use of a mud motor having a bearing assembly, a transmission or coupling assembly, a power section, a rotor catch assembly and a cross over sub-valve. It is contemplated that transmission assembly may have a torque and thrust transfer coupling with the pull load safety device.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved mud motor and or mud motor transmission for directional drilling wherein the system stresses are lower than currently used coupling systems, which may lead to longer component life, ability to accommodate higher torque and horsepower mud motor power sections, and have fewer field failures.

Furthermore, an object of the present invention is to provide a new and improved mud motor and or mud motor transmission apparatus, system and method, which provides enclosed structures to reduce bending stress and face loaded torque assemblies in a universal joint arrangement.

Another object of the present invention is to provide a new and improved mud motor and or mud motor transmission apparatus, system and method that will provide a frictional universal joint arrangement with a closed box support structural arrangement and may provide double shear catch pins as a safety device.

It is a further object of the present invention to provide a new and improved mud motor and or mud motor transmission apparatus, system and method, which is of a durable and reliable construction and may be utilized in numerous types of drilling operations including directional drilling.

An even further object of the present invention is to provide a new and improved mud motor and or mud motor transmission apparatus, system and method, which is susceptible to a competitive cost of installation and labor, which accordingly is then susceptible to low prices of sale to the consuming industry, thereby making such a system economically available to those in the field.

Still another object of the present invention is to provide a new and improved mud motor and or mud motor transmission apparatus, system and method, which provides all of the advantages of the prior art while simultaneously overcoming some of the disadvantages normally associated therewith.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings and appendices.

FIG. 2A is a general illustration of another preferred embodiment in accordance with the current invention depicting an exploded transmission assembly for a mud motor.

FIG. 2B is a general illustration of the preferred embodiment in FIG. 2A in accordance with the current invention depicting a perspective view of a transmission for a mud motor.

FIG. 3 is a general illustration of a preferred embodiment in accordance with the current invention depicting a side view of a transmission for a mud motor.

FIG. 4 is a general illustration of a preferred embodiment in accordance with the current invention depicting a cross section of a transmission for a mud motor as depicted in FIG. 3.

FIG. 3A is a general illustration of another preferred embodiment in accordance with the current invention depicting a side view of a transmission for a mud motor.

FIG. 4A is a general illustration of a preferred embodiment in accordance with the current invention depicting a cross section of a transmission for a mud motor as depicted in FIG. 3A.

FIG. 3B is a general illustration of still another preferred embodiment in accordance with the current invention depicting a side view of a transmission for a mud motor.

FIG. 4B is a general illustration of a preferred embodiment in accordance with the current invention depicting a cross section of a transmission for a mud motor as depicted in FIG. 3B.

FIG. 3C is a general illustration of yet still another preferred embodiment in accordance with the current invention depicting a side view of a transmission for a mud motor.

FIG. 4C is a general illustration of a preferred embodiment in accordance with the current invention depicting a cross section of a transmission for a mud motor as depicted in FIG. 3C.

FIG. 6A is a general illustration of another preferred embodiment in accordance with the current invention depicting an output coupling of a transmission for a mud motor.

DETAILED DESCRIPTION OF INVENTION

Figure 1:
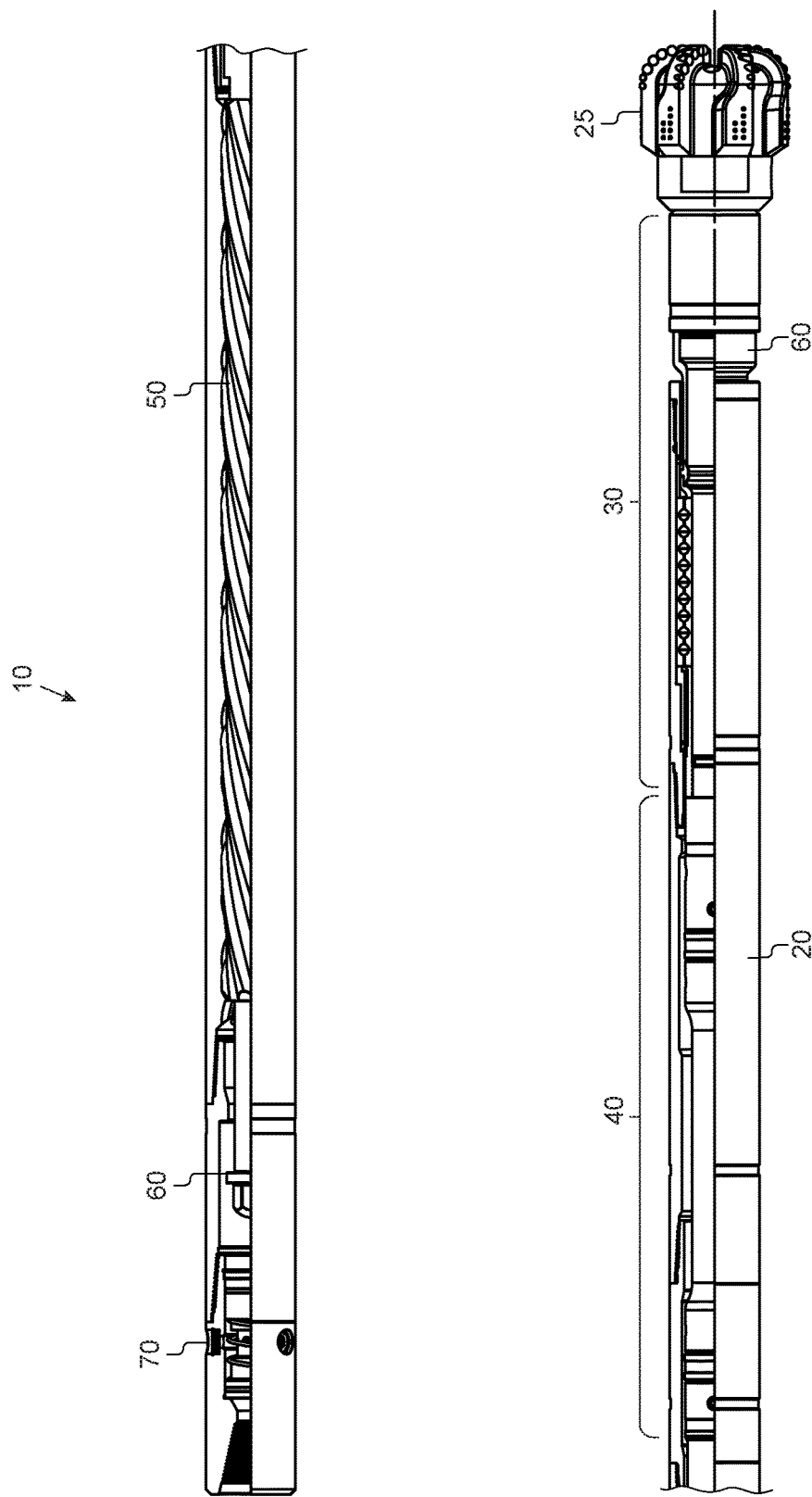
FIG. 1 is a general partial cut away illustration of a preferred embodiment in accordance with the current invention depicting a mud motor assembly.

Referring to the illustrations, drawings, and pictures, reference character 10 generally designates a new and improved mud motor and or mud motor transmission apparatus, system and method of using same constructed in accordance with the present invention. Invention 10 is generally used in drilling operations such as but not limited to horizontal and directional drilling although it is understood that vertical drilling is also contemplated. For purposes of convenience, the reference numeral 10 may generally be utilized for the indication of the invention, portion of the invention, preferred embodiments of the invention and so on.

Figure 2:
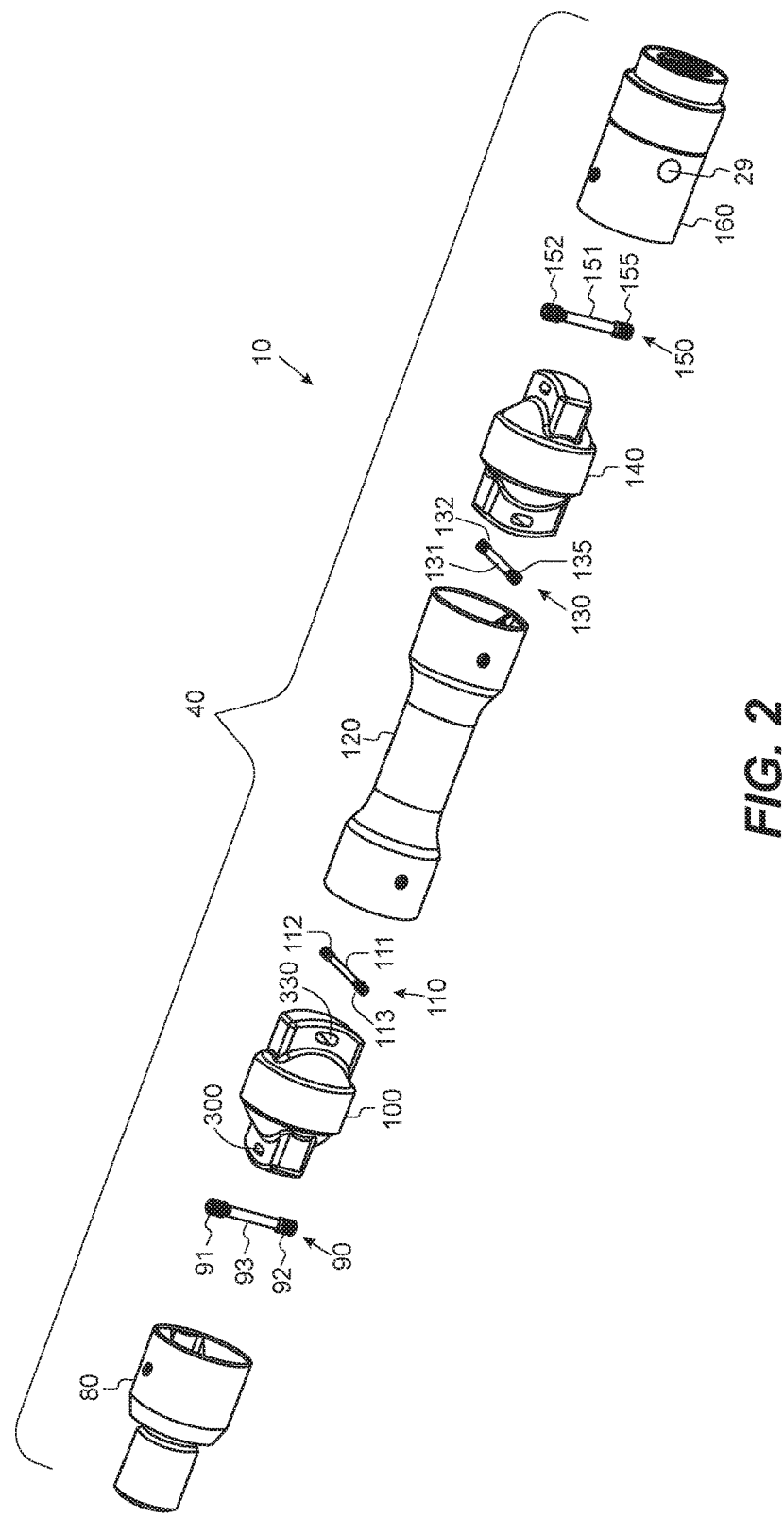
FIG. 2 is a general illustration of a preferred embodiment in accordance with the current invention depicting an exploded transmission assembly for a mud motor.

Referring to the illustrations and more in particular to FIGS. 1 and 2, mud motor 20 may generally comprise a drill bit 25 a bearing and or shaft assembly 30, transmission assembly 40 which may also be referred to as a universal drive shaft and or coupling assembly, a drive motor or power section 50 also referred to as a rotor and stator motor assembly, a rotor catch assembly 60, and a cross over sub-valve also known as a dump sub and or dump valve 70.

Invention 10 contemplates transmission assembly 40 as generally depicted in the exploded view in FIG. 2 and may generally be located between bearing assembly 30 and power section 50. Transmission assembly 40 may include input coupling 80, a safety pin or first pin assembly 90, a first transfer coupling 100 also referred to as a torque and thrust transfer coupling 100, a second pin assembly 110, an intermediate shaft 120, a third pin assembly 130, a second transfer coupling 140 also referred to as second torque and thrust transfer coupling 140, a fourth pin assembly 150, an output coupling 160, and so forth.

First pin assembly 90 may include pin 93, first set screw 91, second set screw 92 and so forth. Second pin assembly 110, may include pin 111, first set screw 112, second set screw 113 and so forth. Third pin assembly 130, may include pin 131, first set screw 132, second set screw 135 and so forth. Fourth pin assembly 150, may include pin 151, first set screw 152, second set screw 155 and so forth. It is understood that pin assemblies may be of numerous configurations and may or may not be identical. It is understood that the current invention should not be limited to the illustrations.

Now referring to FIG. 2A, invention 10 contemplates another preferred embodiment with a first grease retention sleeve assembly 42 with first rubber sleeve 43, a first band 44 and a second band 45. It is also contemplated to provide a second grease retention sleeve assembly 46 with second rubber sleeve 47, a first metal clamping band or first band 48 and a second metal clamping band or second band 49. FIG. 2B is generally the same embodiment of exploded view FIG. 2A but assembled. A more detailed discussion of the same is further below.

Again referring to the illustrations and more in particular to FIG. 3 and corresponding FIG. 4, invention 10 contemplates a face contacting universal style joint that has advantages over the prior art. It is understood that invention 10 may run as smoothly as a constant velocity joint, also known as a CV joint, but have the capacity to carry more than twice the load and torque of the prior art.

FIG. 4 also generally depicts that rotation 26 is to the right although it is contemplated that it may be to the left. Thrust load 27 is generally depicted as well as reaction 28. Flow passage 29 generally depicts passage for drilling mud flow.

FIG. 3A and corresponding FIG. 4A generally depict another preferred embodiment while FIG. 3B and corresponding FIG. 4B generally depict still another preferred embodiment wherein first grease retention sleeve assembly 42 and second grease retention sleeve assembly 46 are included. First grease retention sleeve assembly 42 and second grease retention sleeve assembly 46 are discussed further below.

FIG. 3C and corresponding FIG. 4C depict yet another embodiment and are discussed further below.

Figure 5:
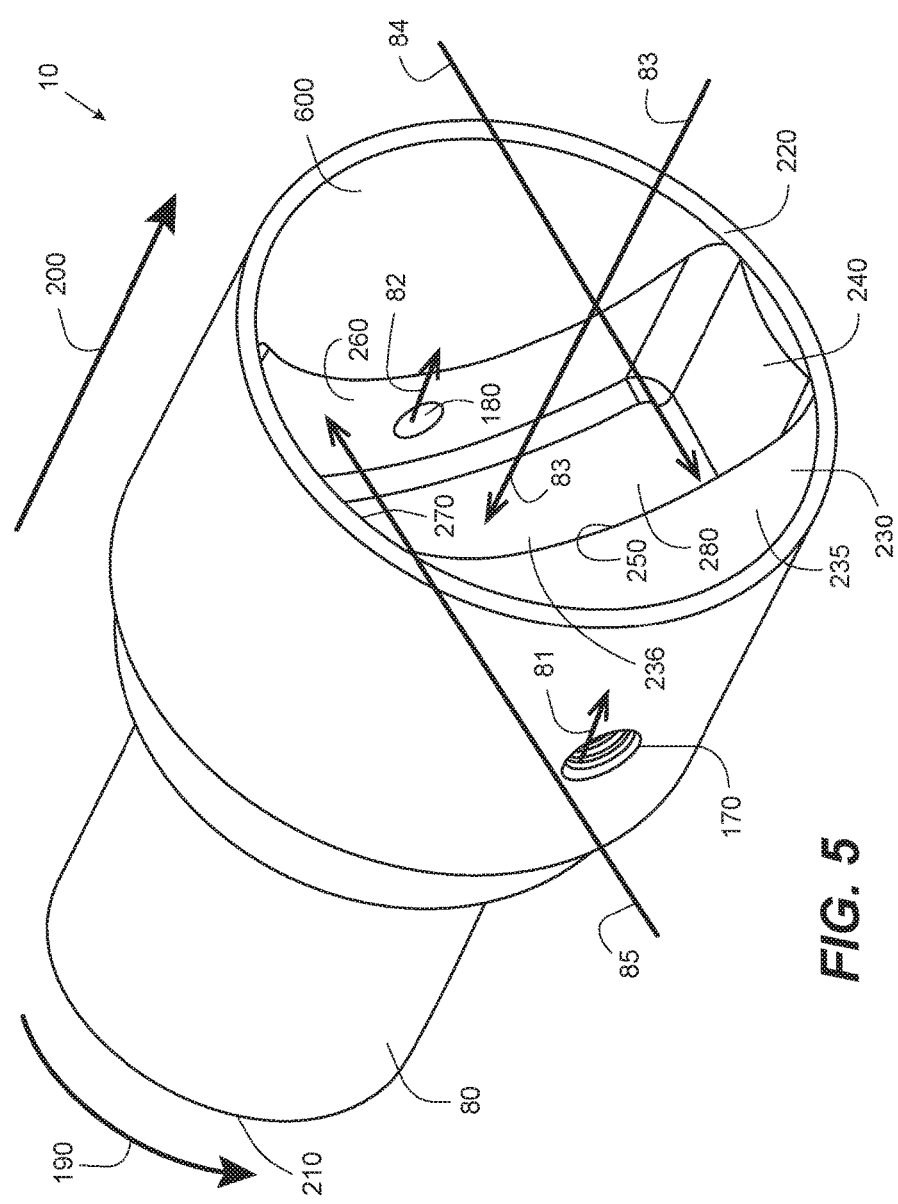
FIG. 5 is a general illustration of a preferred embodiment in accordance with the current invention depicting an input coupling of a transmission for a mud motor.

FIG. 5 is a general illustration of input coupling 80 depicting safety pin interface holes and or apertures 170 and 180, input torque rotation 190, and input thrust load 200. Input coupling 80 generally has a first end 210 for attaching to power section 50 and a second end 220 having a recessed area 230 adapted to receive first transfer coupling 100. Recessed area 230 is generally a recessed partial hemisphere 235 with a slot 236. It is contemplated that recessed area 230 generally has but not limited to first side face 240, second side face 250, third side face 260, and fourth side face 270. It is contemplated first side face 240 and fourth side face 270 may not carry torque in an embodiment and may in other embodiments. Recessed area 230 also has a thrust face 280.

It is understood aperture 170 may have a direction of force 81 and aperture 180 may have a direction of force 82. It is understood in case the need to pull on the input coupling 80 in the direction opposite input thrust load 200, axial load is reacted on the safety pin and or first pin assembly 90 and associated apertures 170 and 180. Thrust reaction 83 may be on thrust face 280. Torque reaction 84 may be on second side face 250 and corresponding torque reaction force 85 on third side face 260.

Figure 7:
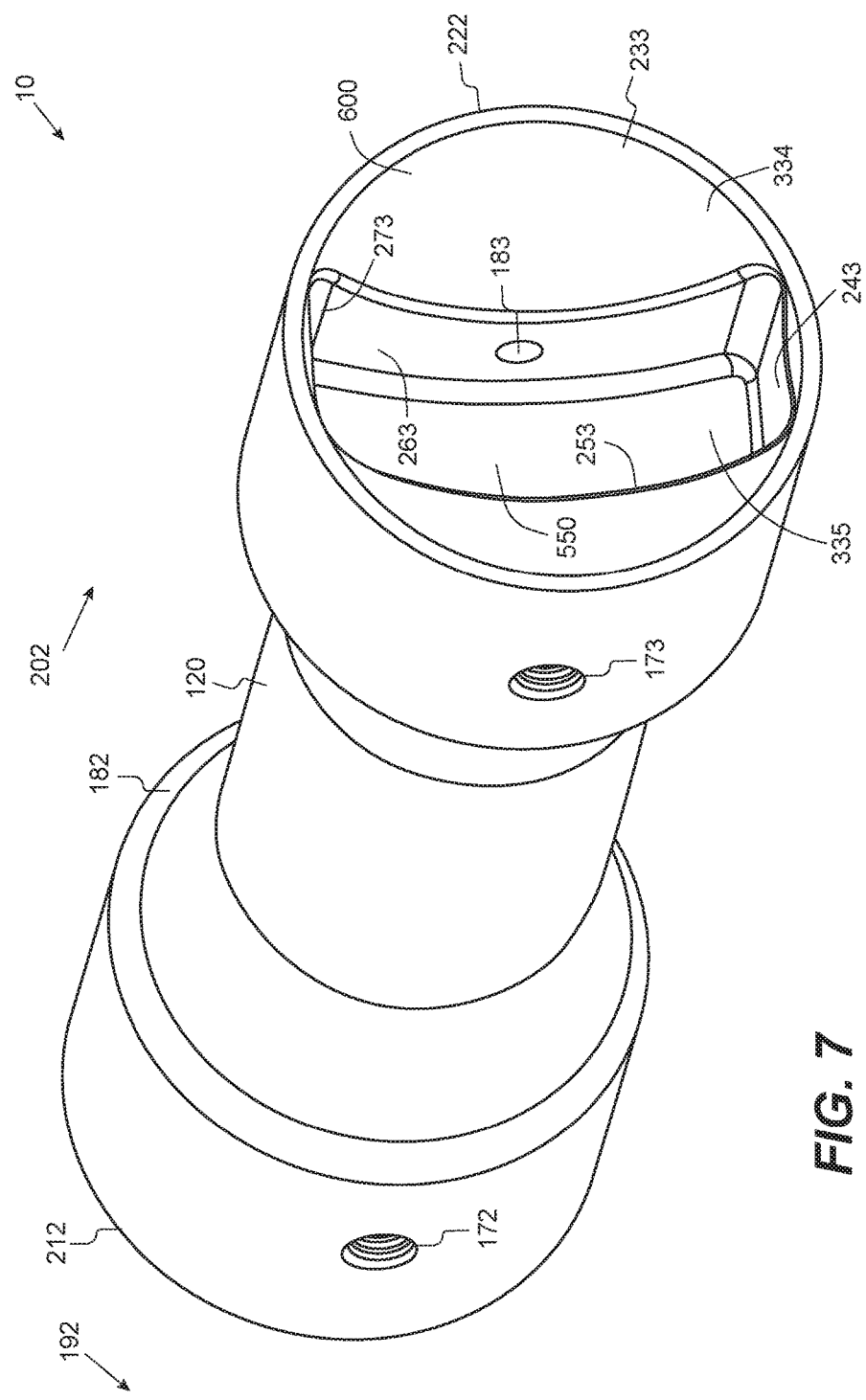
FIG. 7 is a general illustration of a preferred embodiment in accordance with the current invention depicting an intermediate shaft of a transmission for a mud motor.
Figure 7A:
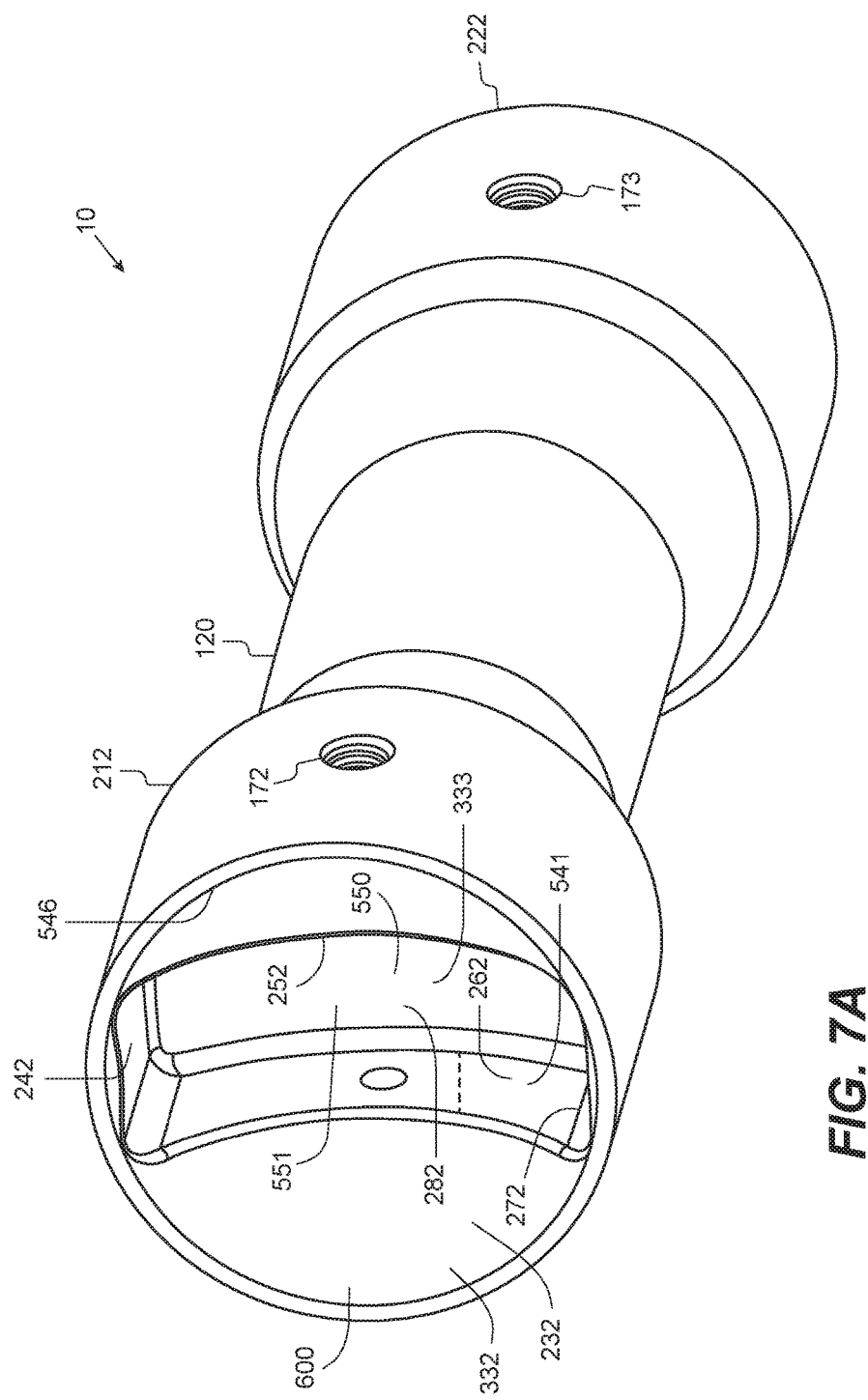
FIG. 7A is a general illustration of a preferred embodiment in FIG. 7 in accordance with the current invention depicting another end of an intermediate shaft of a transmission for a mud motor.
Figure 8:
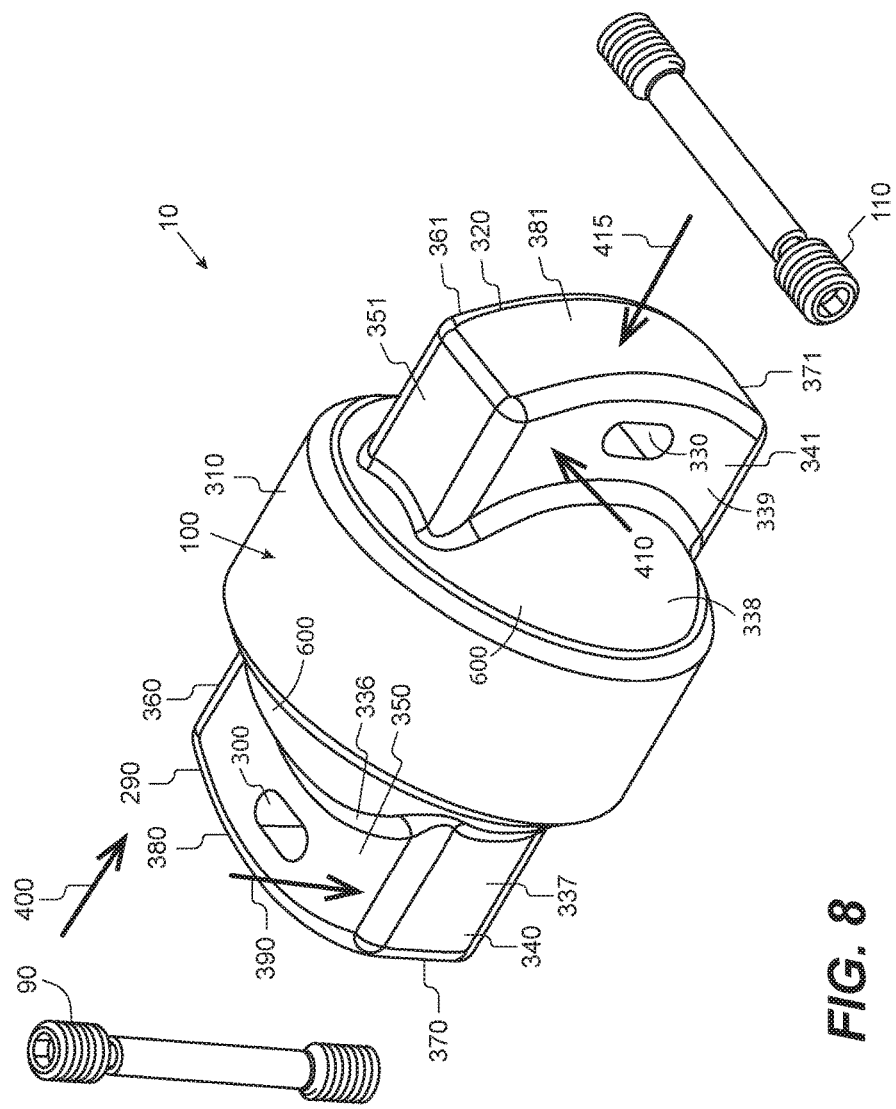
FIG. 8 is a general illustration of a preferred embodiment in accordance with the current invention depicting a load transfer coupling of a transmission for a mud motor.

Referring generally also to FIG. 8 which is also discussed more in detail below, the torque load transmission during rotation may result in a large reaction force perpendicular to the face of the first transfer coupling 100 tabs 337 and tab 339 and the corresponding face in the respective slot 236 and slot 333 (FIG. 7A). To form a balanced torque reaction force in joint assembly 420 as well as joint assembly 430 (FIG. 4A), there must be a corresponding face contact and force diagonally disposed on the opposite side of the respective tab and slot. The contacting faces of the respective tab and slot may translate one relative to the other in a rocking motion during rotation of the transmission assembly 40. During the application of torque from the drive motor and or power section 50, the torque reaction force on the faces of the joint assembly 420 respective tabs and slots may be high and may be moving one relative to the other. This is also understood in regards to second transfer coupling 140 and respective joint assembly 430.

Invention 10 contemplates that transmission assembly 40 input coupling 80, first torque and thrust transfer coupling 100, intermediate shaft 120, second torque and thrust transfer coupling 140, output coupling 160, may be made from high strength heat treated alloy steel. To reduce the wear of the mating surfaces subject to high loads and relative motion, these surfaces may utilize a layer of material 53 (FIG. 5A) having properties substantially harder than the alloy steel of the body of the components.

The hard facing material may be but is not limited to tungsten carbide composite. It may also be but not limited to STELLITE, a trademarked name of the KENNAMETAL STELLITE COMPANY, for an alloy that is a range of cobalt-chromium alloys designed for wear resistance. STELLITE may also contain tungsten or molybdenum and a small but important amount of carbon. It is understood that material may be combinations of the aforementioned and other known materials.

Tungsten carbide composites or hard alloy metals may be applied by direct thermal fusion such as laser or electric welding methods. Tungsten carbide and similar composites may also be applied by high velocity, high temperature particle impingement methods such as high velocity oxy fuel or gas plasma devices. Preformed tungsten carbide inserts may also be applied for this application using brazing techniques. In addition, a hard, wear resistant surface on the alloy steel can be produced by carburizing or nitriding methods.

Figure 5A:
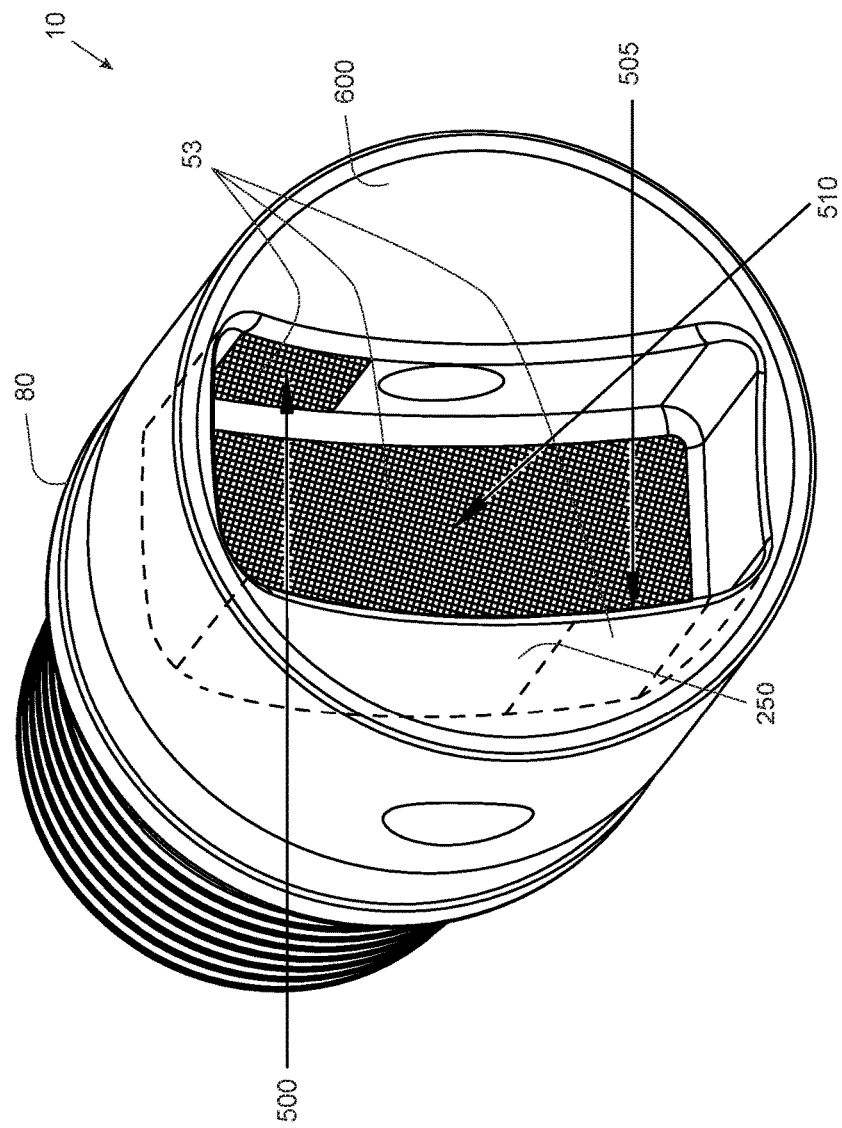
FIG. 5A is a general illustration of another preferred embodiment in accordance with the current invention depicting an input coupling of a transmission for a mud motor.
Figure 5B:
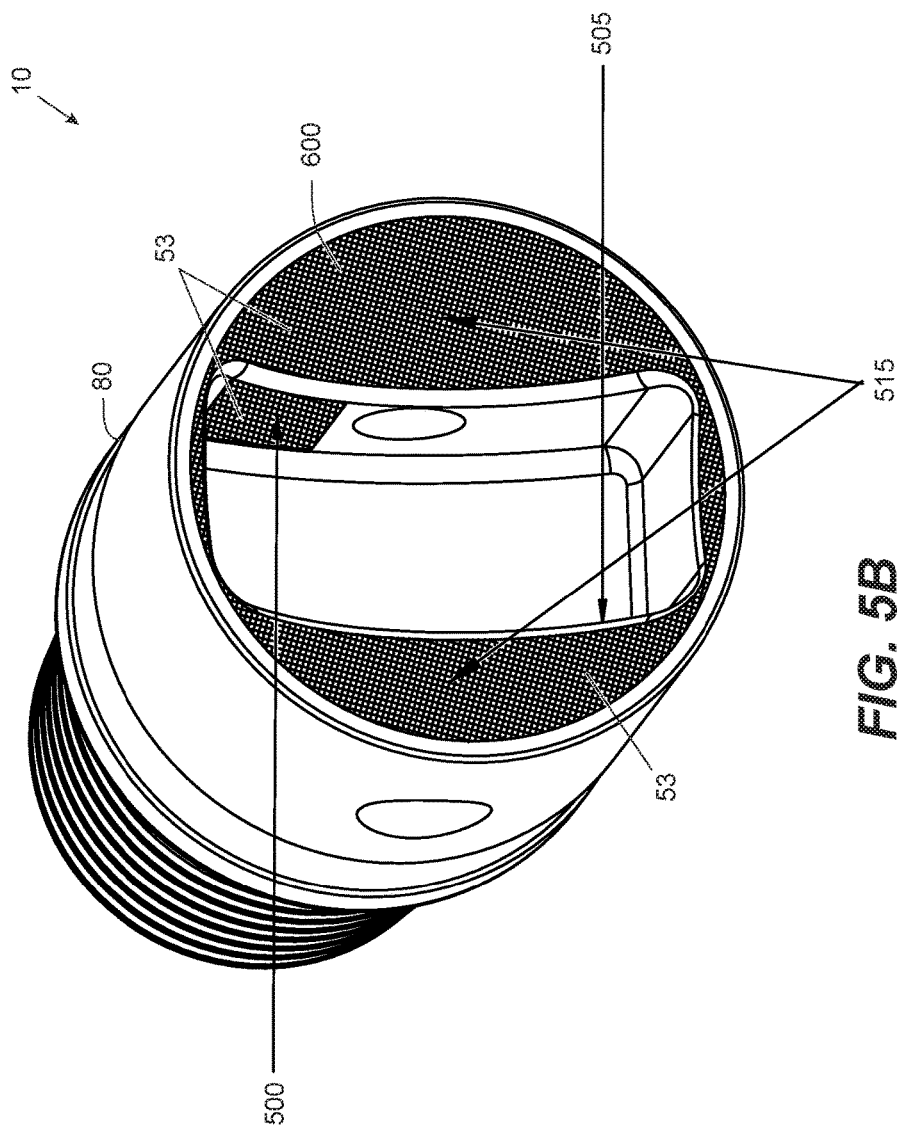
FIG. 5B is a general illustration of still another preferred embodiment in accordance with the current invention depicting an input coupling of a transmission for a mud motor.

FIG. 5A generally depicts a preferred embodiment wherein a first torque reaction face 500, a second torque reaction face 505 and thrust reaction face 510 are coated with a wear resistant material 53 such as but not limited to tungsten carbide. FIG. 5B is the same as FIG. 5A, but with another preferred embodiment wherein thrust reaction face 510 is not coated and hemispherical thrust reaction face 515 is coated. It understood that combinations of coating, coating the entire facing, contacts, and so forth is contemplated.

Figure 6:
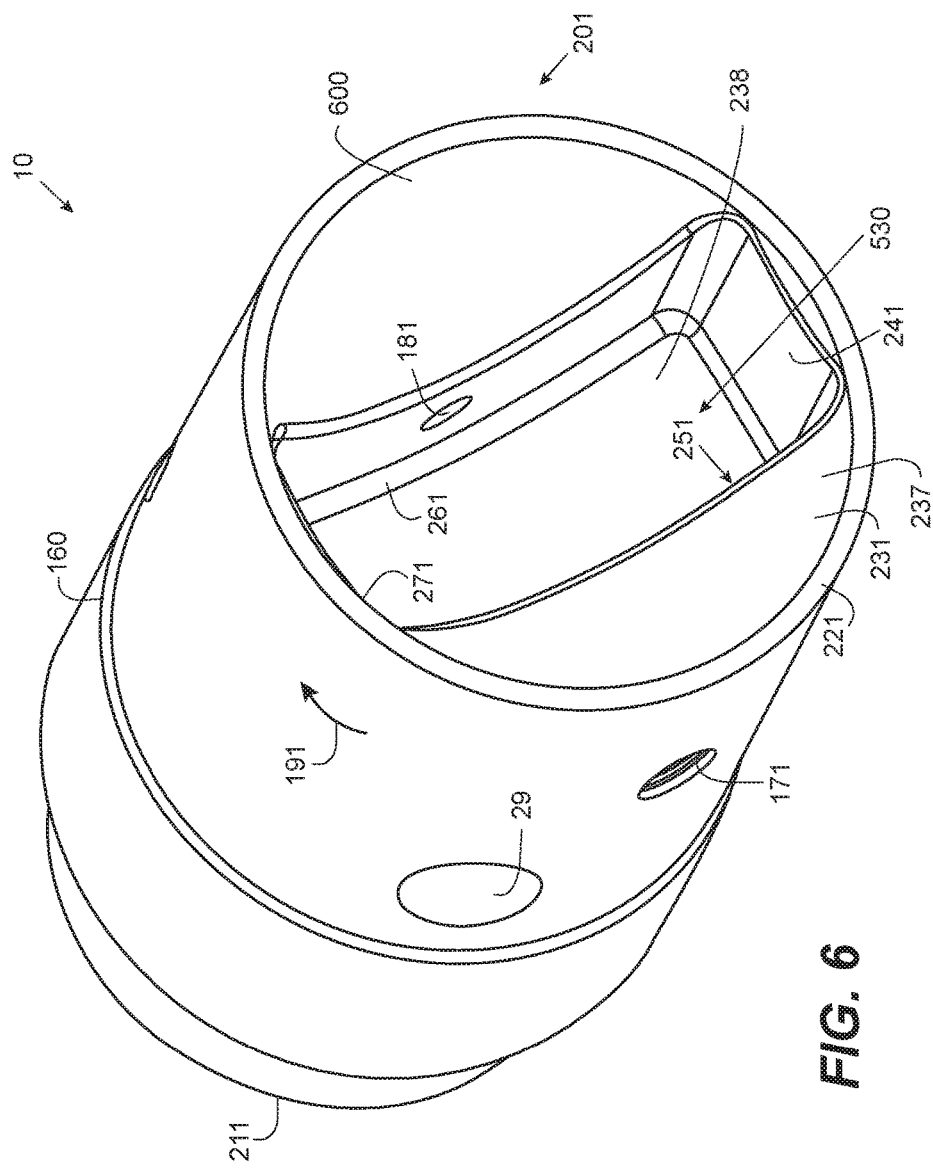
FIG. 6 is a general illustration of a preferred embodiment in accordance with the current invention depicting an output coupling of a transmission for a mud motor.

FIG. 6 is a general illustration of output coupling 160 depicting safety pin interface holes and or apertures 171 and 181, input torque rotation 191, and input thrust load 201. Output coupling 160 generally has a first end 211 for attaching to bearing assembly 30 and a second end 221 having a recessed area 231 adapted to receive second transfer coupling 140. Recessed area 231 is generally a recessed partial hemisphere 237 with a slot 238. It is contemplated that recessed area 231 generally has a torque facing such as but not limited to first side face 241, second side face 251, third side face 261, and fourth side face 271. It is contemplated first side face 241 and fourth side face 271 may not carry torque.

Recessed area 231 also has a thrust reaction face 530. It is understood in case the need to pull on the output coupling 160, axial load is reacted on the safety pin and or fourth pin assembly 150 and associated apertures 171 and 181.

Figure 6B:
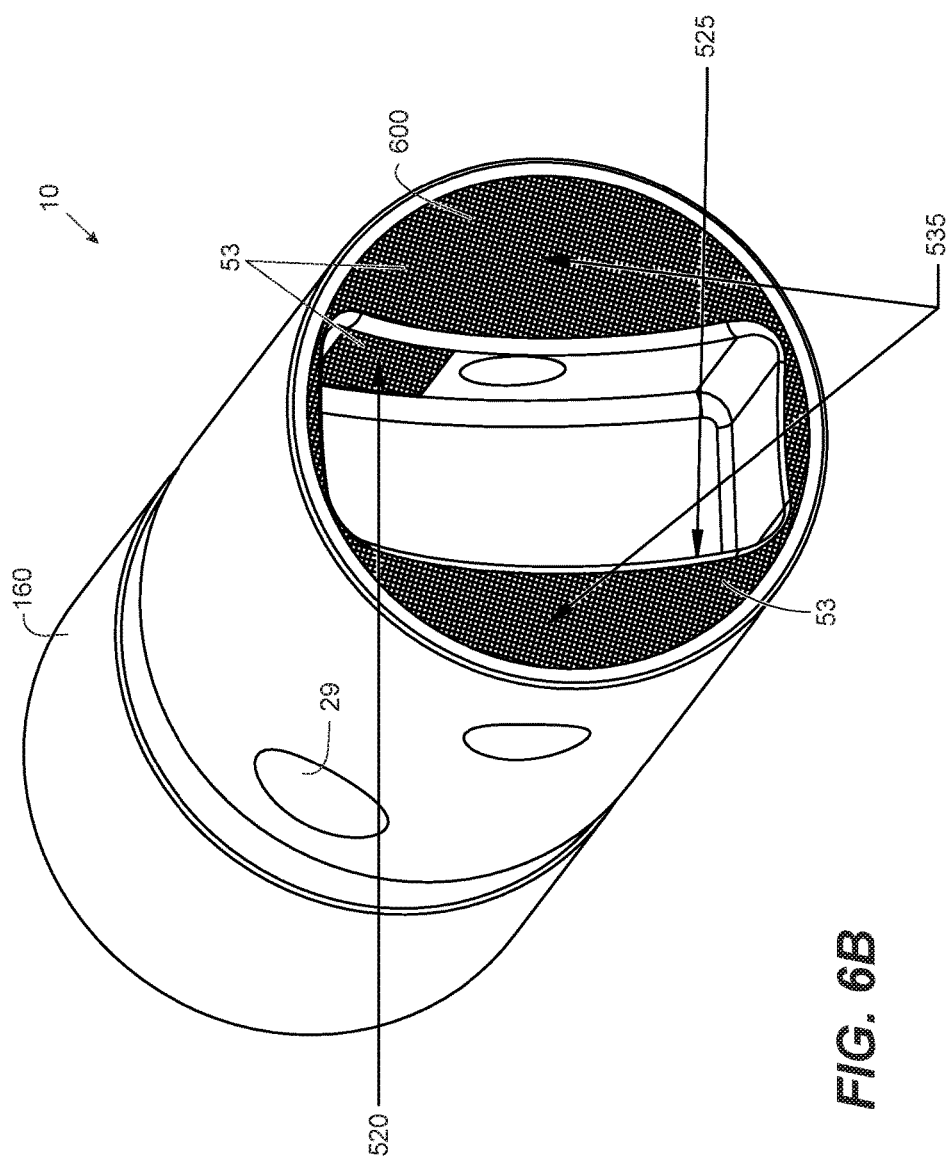
FIG. 6B is a general illustration of still another preferred embodiment in accordance with the current invention depicting an output coupling of a transmission for a mud motor.

FIG. 6A generally depicts a preferred embodiment wherein a first torque reaction face 520, a second torque reaction face 525 and thrust reaction face 530 are coated with a wear resistant material 53 such as but not limited to tungsten carbide. FIG. 6B is the same as FIG. 6A, but with another preferred embodiment wherein thrust reaction face 530 is not coated and hemispherical surface 535 is coated. It understood that combinations of coating, coating the entire facing, contacts, and so forth is contemplated.

FIG. 7 is a general illustration of intermediate shaft 120 with a first end 212 and a second end 222 that are the same. First end 212 generally has safety pin interface holes and or aperture 172 and 182. Input torque rotation 192 and input thrust load 202 are also depicted. Shaft 120 generally has first end 212 for attaching to first transfer coupling 100 and second end 222 to receive second transfer coupling 140.

Recessed area 233 may generally have a torque facing such as but not limited to first side face 243, second side face 253, third side face 263, and fourth side face 273. Area 233 also has a thrust reaction face 550. It is understood in case the need to pull on the shaft 120, axial load is reacted on the safety pin and or third pin assembly 130 and associated holes and or apertures 173 and 183.

Intermediate shaft 120 second end 222 generally depicts safety pin interface holes and or aperture 173 and 183. Shaft 120 generally has second end 222 for attaching to second transfer coupling 140. It is contemplated that second end 222 has recessed area 233, which is generally a recessed partial hemisphere 334 with a slot 335.

FIG. 7A generally depicts first end 212 has a recessed area 232 that is generally a recessed partial hemisphere 332 with a slot 333. Recessed area 232 may generally have a torque facing such as but not limited to first side face 242, second side face 252, third side face 262, and fourth side face 272. Recessed area 232 also has a thrust reaction face 551. It is understood in case the need to pull on the output coupling 160, axial load is reacted on the safety pin and or second pin assembly 110 and associated holes and or apertures 172 and 182.

Figure 7B:
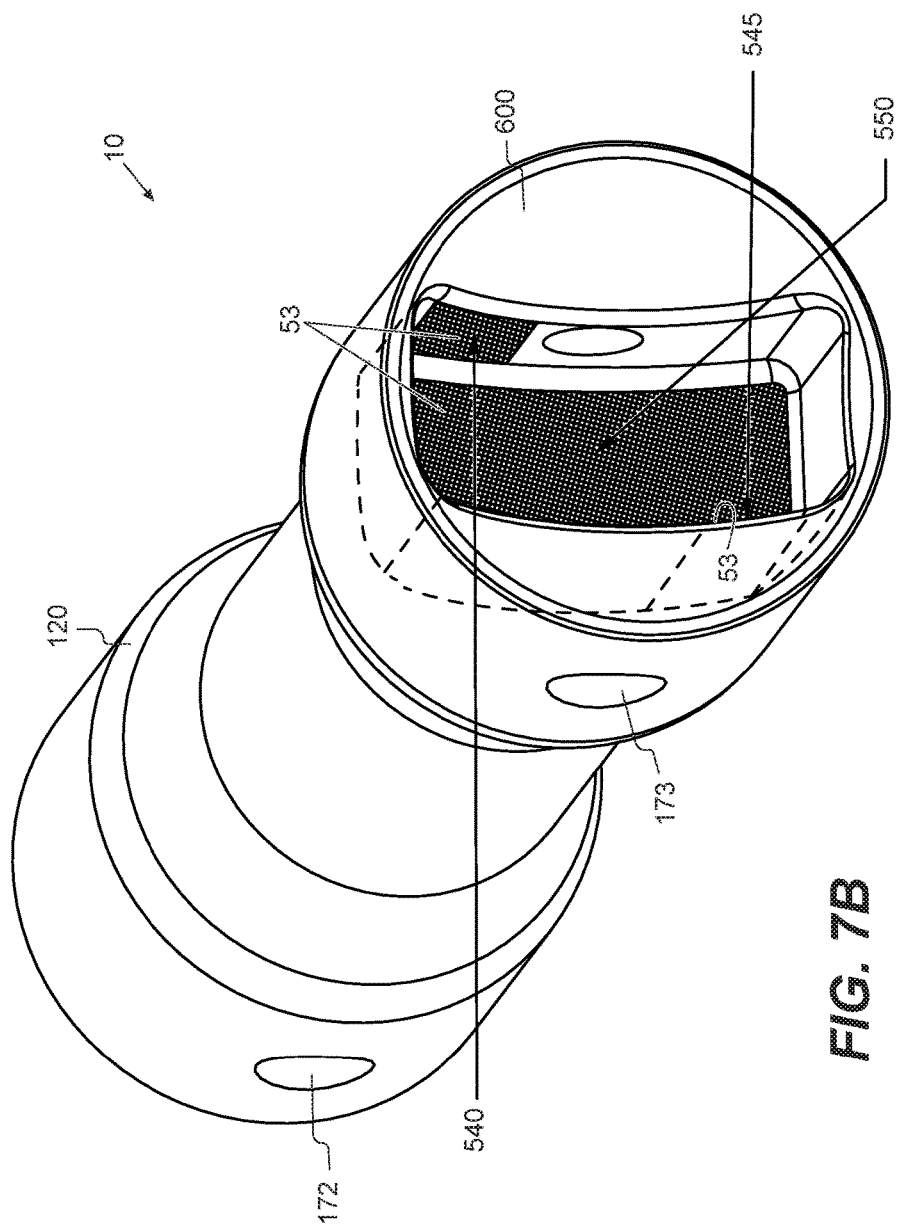
FIG. 7B is a general illustration of another preferred embodiment in accordance with the current invention depicting an intermediate shaft of a transmission for a mud motor.
Figure 7C:
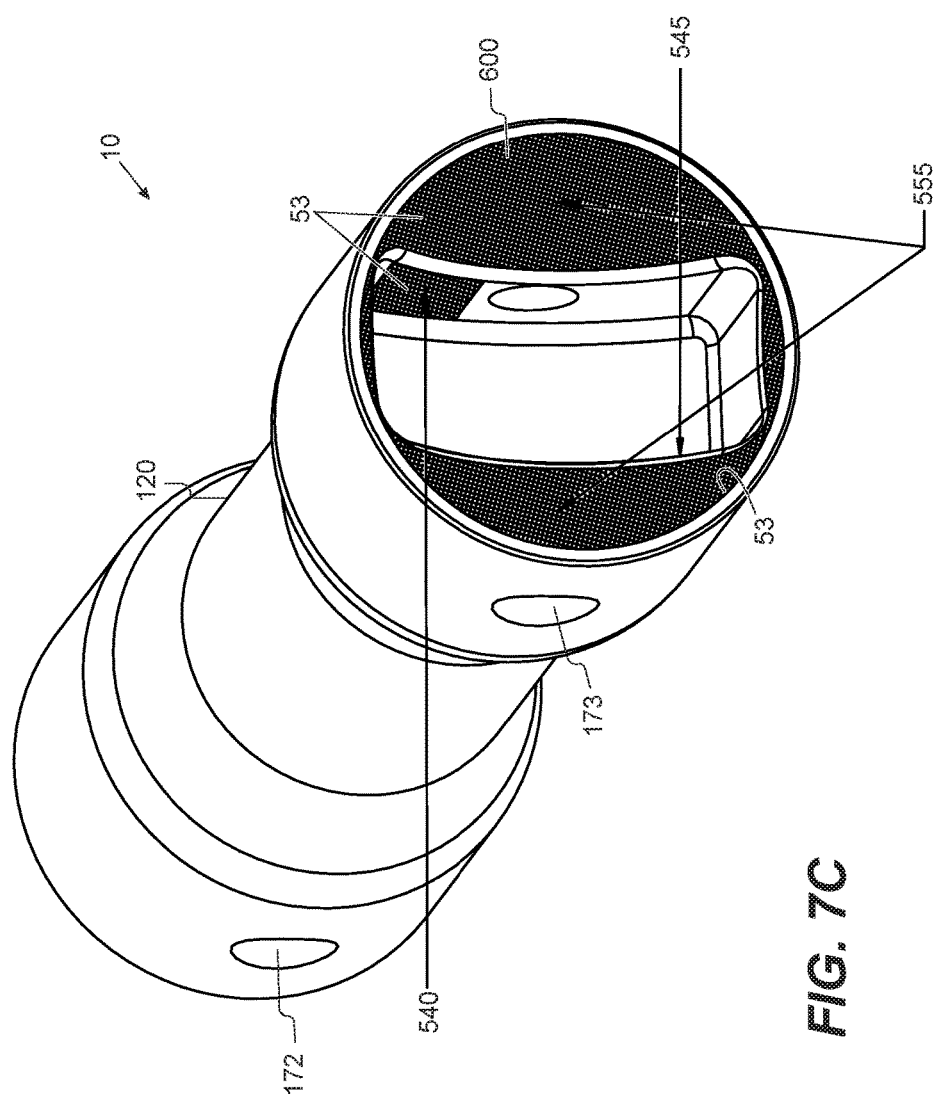
FIG. 7C is a general illustration of still another preferred embodiment in accordance with the current invention depicting an intermediate shaft of a transmission for a mud motor.

FIG. 7B generally depicts a preferred embodiment wherein a first torque reaction face 540, a second torque reaction face 545 and thrust reaction face 550 are coated with a wear resistant material 53 such as but not limited to tungsten carbide. FIG. 7C is the same as FIG. 7B, but with another preferred embodiment wherein thrust reaction face 550 is not coated and first hemispherical thrust reaction face 555 is coated.

It is understood that first end 212 and second end 222 of intermediate shaft 120 are generally the same and that second end 222 may have, a first torque reaction face 541, a second torque reaction face 546 and thrust reaction face 551 that may be coated with a wear resistant material 53 such as but not limited to tungsten carbide such as depicted in FIGS. 7B and 7C. It is understood that combinations of coating, coating the entire facing, contacts, and so forth is contemplated.

FIG. 8 generally illustrates first transfer coupling 100 and second transfer coupling 140, which are generally the same although it is understood that differences are contemplated. First transfer coupling 100 may include a first end 290 with aperture 300, a middle section 310, and a second end 320 with aperture 330. First end 290 and second end 320 are generally the same but offset at a 90-degree angle and generally cylindrical about a common center point. This may allow the couplings to rock back and forth as the power section 50 input rotates and translates and the intermediate shaft 120 is angularly offset from both the input coupling 80 and output coupling 160. Apertures 300 and 330, also referred to as catch pin interfaces, are elongated to allow the couplings to rock back and forth without interfering with pin assembly 90, 110, 130, and or 150. Catch pins 93, 111, 131 and 151 may be held in place by two set screws threaded into input coupling 80 and or output couplings 160 respectively. It is also contemplated that pin assembly 90, 110, 130, and or 150 may be and or utilize double shear catch pins.

First end 290 may include a partial hemisphere 336 with tab 337. Second end 320 may also include a partial hemisphere 338 with tab 339. First end 290 may include first face 340, a second face 350, third face 360, a fourth face 370 and a thrust face 380. Second end 320 may include a first face 341, second face 351, a third face 361, fourth face 371 and a thrust face 381. In case of the need to pull up, axial load is reacted on first pin assembly 90 and or second pin assembly 110 and associated apertures 300 and or 330. Torque input 390 and thrust input 400 are generally depicted as well as thrust input 410 and thrust reaction 415.

Figure 8A:
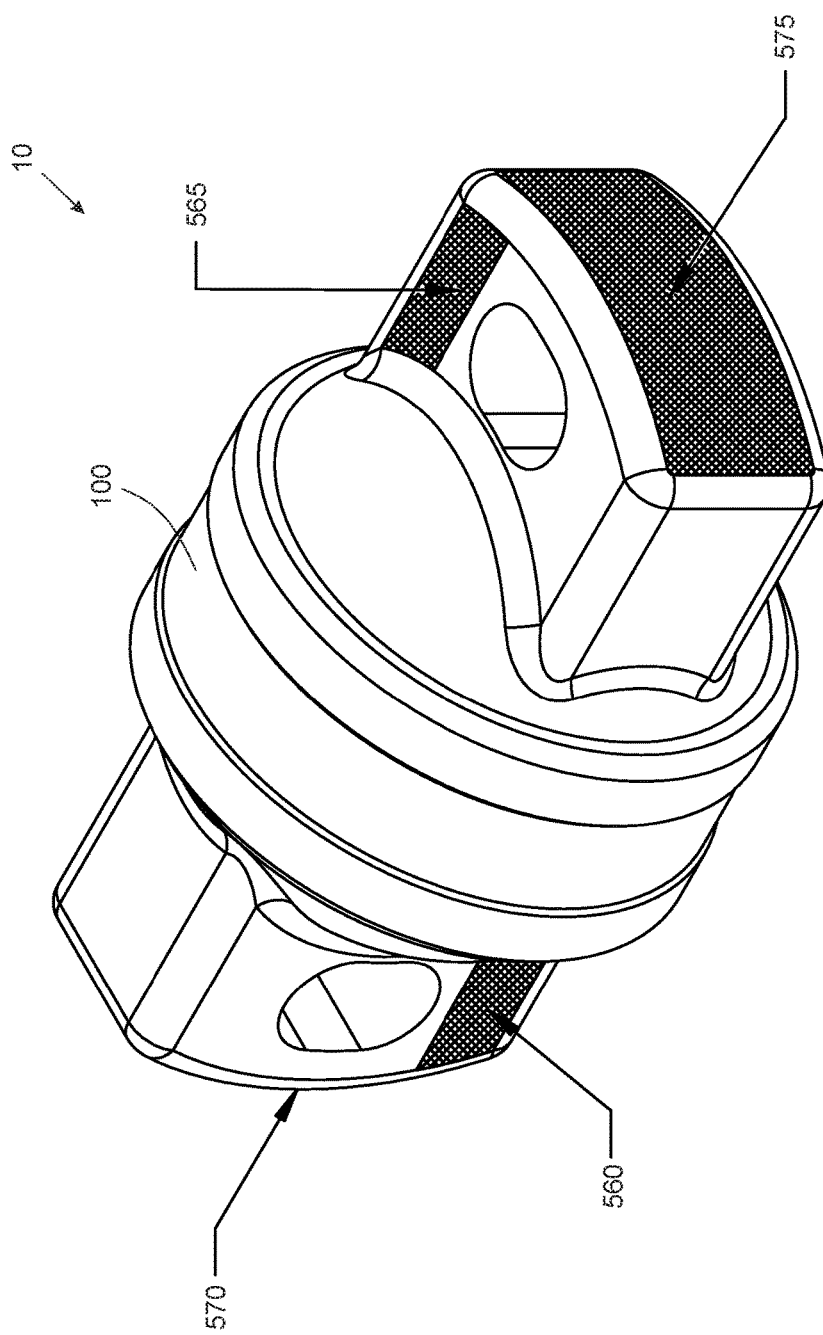
FIG. 8A is a general illustration of another preferred embodiment in accordance with the current invention depicting a load transfer coupling of a transmission for a mud motor.
Figure 8B:
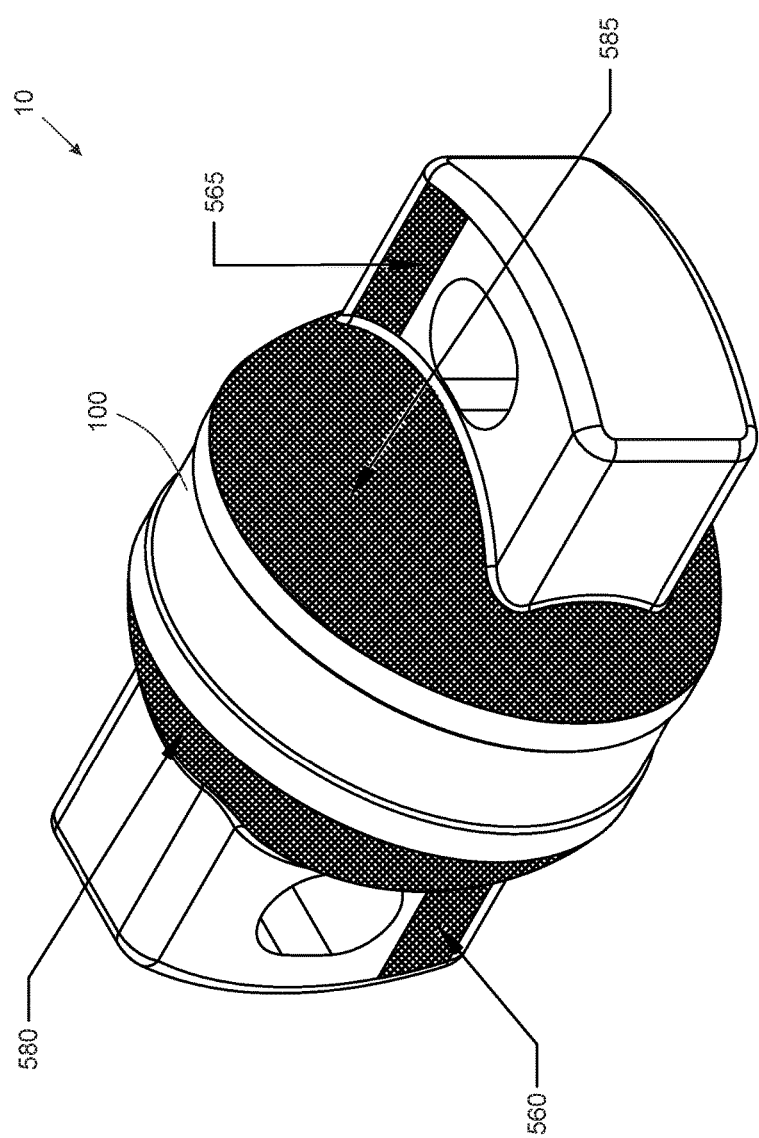
FIG. 8B is a general illustration of still another preferred embodiment in accordance with the current invention depicting a load transfer coupling of a transmission for a mud motor.

FIG. 8A generally depicts a preferred embodiment wherein a first torque reaction face 560, a second torque reaction face 565, a first thrust reaction face 570, and a second thrust reaction face 575 are coated with a wear resistant material 53 such as but not limited to tungsten carbide. FIG. 8B is the same as FIG. 8A, but with another preferred embodiment wherein first thrust reaction face 570 and second thrust reaction face 575 are not coated and first hemispherical thrust reaction face 580 and second hemispherical thrust reaction face 585 are coated. It is understood that combinations of coating, coating the entire facing, contacts, and so forth is contemplated.

Generally, the torque, such as torque input 390, and thrust load, such as thrust input 400 are applied to the transmission assembly 40 and reacted through first transfer coupling 100 joint assembly 420 and second transfer coupling 140 joint assembly 430. The thrust load may react against the cylindrical faces of tabs 337 and tab 339 and respective slots, such as slot 236, slot 330, slot 335, and slot 238 of joint assembly 420 and joint assembly 430 respectively or on the hemispherical faces of the of joint assembly 420 and 430 respectively. In both cases, the surfaces may move one relative to the other during transmission assembly 40 rotation. Due to the load and relative motion, the contacting surfaces may be subject to friction and high wear.

Once again referring again to FIG. 5, FIG. 6, and FIG. 8, faces 240, 270, 241, and or 271 may be arranged to allow clearance to faces 340, 360, 351, and or 371 such that the transfer couplings 100 and or 140 can rock back and forth inside recesses 230 and or 231 without the respective faces touching.

Figure 9:
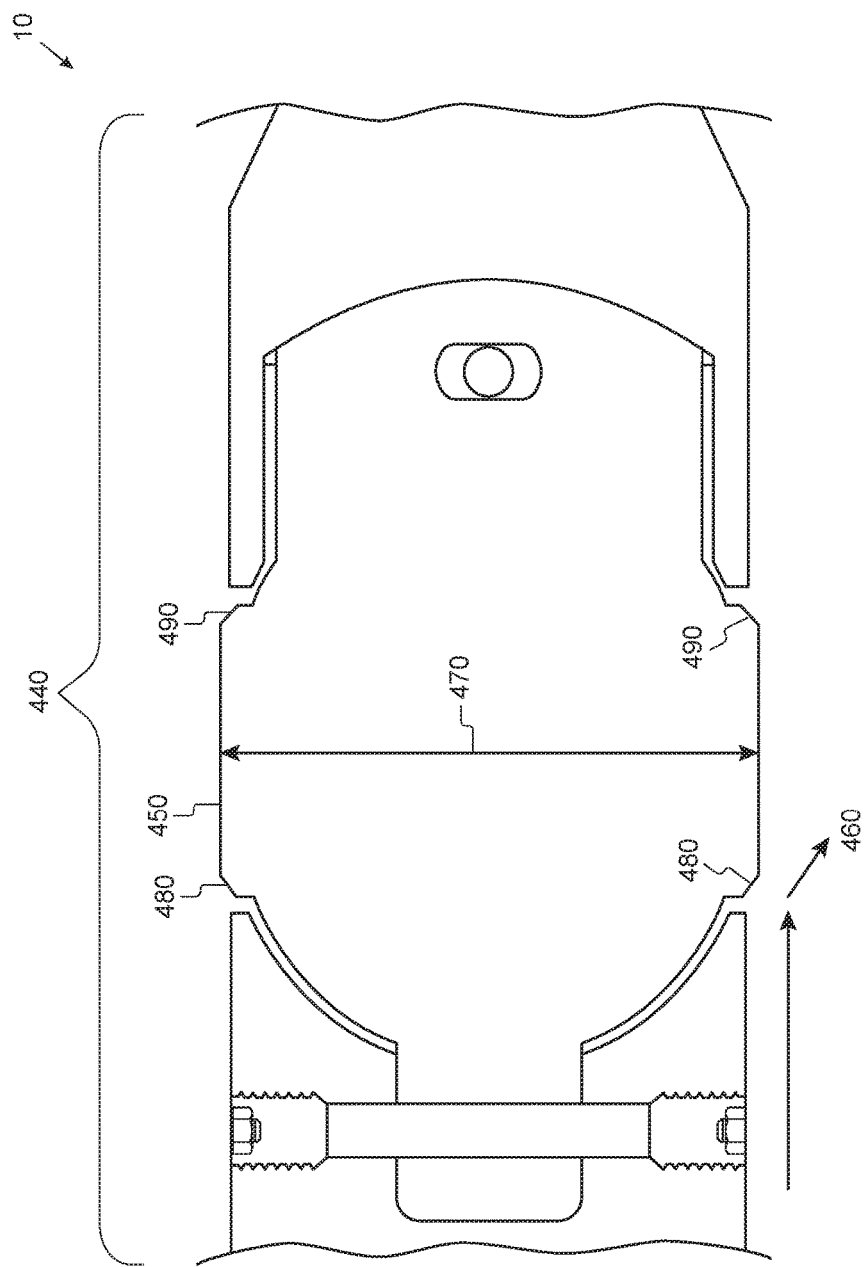
FIG. 9 is a general illustration of a preferred embodiment in accordance with the current invention depicting a transfer coupling and input coupling of a transmission for a mud motor.

Referring to FIG. 9 also FIGS. 4, 4A, 4B, and 4C, it is contemplated as the two torque transfer surfaces wear relative to one another, the degree of face contact in the joint assembly 420 and 430 increases, which may lower the contact pressures and stresses in the joint assembly 420 and 430. It is understood that joint assembly 420 is generally the same as joint assembly 430 although it is to be understood that differences may be utilized.

It is also contemplated invention 10 may include a cylindrical flow control joint assembly 440 wherein first transfer coupling 100 and second transfer coupling 140 middle section 310 includes a cylindrically larger portion 450. It is understood that as the high velocity, high pressure, and or flowing abrasives erode steel as they flow 460 over metal components. It is also known that any exposed edges may suffer higher erosion, which is a particular risk for shaft components with openings facing the direction of flow.

Invention 10 therefore contemplates providing cylindrical larger portion 450 on transfer coupling 100 and 140 that may have a larger diameter 470 than the input coupling 80 diameter 471, output coupling 160 diameter 472, and or intermediate shaft 120 diameter 473. This may allow flow 460 to initially be deflected away from flow interface and or opening 480 and there to be an out of flow step at opening 490. Invention 10 further contemplates joint assemblies 420 and 430 are not sealed. This may allow flow 460 around joint assemblies 420 and 430 to wet the internal surfaces of the joints and lubricate same. It is understood that joint assemblies 420 and 430 may be sealed and combinations thereof.

Once again referring to the illustration and more in particular to FIGS. 2A and 2B, FIGS. 3B and 4B, and FIGS. 3C and 4C, invention 10 further contemplates in another preferred embodiment that first transfer coupling 100 and second transfer coupling 140 are essentially sealed with first grease retention sleeve assembly 42 second grease retention sleeve assembly 46. It is also understood that invention 10 may not utilize cylindrical larger portion 450 in this embodiment.

First rubber sleeve 43 may generally be positioned on input coupling 80 with a first band 44 and positioned on intermediate shaft 120 with second band 45 essentially covering and creating seal 51 over first torque and thrust transfer coupling 100. Second Rubber sleeve 47 may generally be positioned on output coupling with first band 48 and positioned on intermediate shaft 120 with second band 49 input essentially covering and creating a seal 52 and over second torque and thrust transfer coupling 140.

First rubber sleeve 43 and second rubber sleeve 47 may generally be cylindrical, one piece, and an elastic material capable of being stretched over the body of the first transfer coupling 100 and second transfer coupling 140. A preferred material may be but is not limited to nitrile rubber, fabric reinforced elastomers, and so forth known in the art.

Seal 51 and seal 52 may be filled and or packed with pressure grease during assembly after which first rubber sleeve 43 and second rubber sleeve 47 are applied. It is also contemplated to apply first rubber sleeve 43 and second rubber sleeve 47 first and then the grease can be pressure injected using a grease gun through suitable ports (not depicted) in the intermediate shaft 120, input coupling 80, output couplings 160, combinations thereof and so for. The injection ports could then be plugged with a set screw (also not depicted).

FIG. 3C and FIG. 4C generally depict still another preferred embodiment wherein it is contemplated that the thrust load 27 path through the first transfer coupling 100 and second transfer coupling 140 may generally be on the hemispherical faces 600 on the corresponding elements, such as but not limited to hemispherical thrust reaction face 515 of input coupling 80, hemispherical thrust reaction face 535 of output coupling 160, a first hemispherical thrust reaction face 555 and second hemispherical thrust reaction face 556 of intermediate shaft 120, first hemispherical thrust reaction face 580 and second hemispherical thrust reaction face 585 of first transfer coupling 100, which would also be the same for second transfer coupling 140.

In this embodiment, the hemispherical faces 600 of the components of joint assembly 420 and 430 are designed to be in contact. The tabs and respective slot, such as but not limited to first transfer coupling 100 tabs 337 and tab 339 and the corresponding face in the respective slot 236 and slot 333 are separated by a gap 610. The thrust load 27 is thereby transmitted through the hemispherical faces 600 of the torque and thrust transfer couplings 100 and 140 of the jointed transmission assembly 40 assembly.

It is contemplated to achieve maximum torque transmission, the area of hemispherical faces 600 contact may be approximately twice as much as the area would be on the cylindrical contact face on the end of the tab. The contact pressure of the hemispherical load path configuration may be much less than for the cylindrical load path configuration. This feature may reduce joint friction and wear.

It is also contemplated the hemispherical contact configuration may provide a reduction of torque resistance in the joints of the transmission assembly 40. The friction reaction force on the hemispherical faces 600 may be less than half the distance to the swivel axis of the joint than in the case of the friction reaction force on the faces of the cylindrical joint load path configuration. Reducing the friction reaction load distance by half can reduce the torque resistance by half due to the action of the thrust load on the joint. It is understood that this may not reduce the total torque resistance of the joint by half.

Therefore, invention 10 contemplates a mud motor comprising a bearing assembly; a transmission in communication with said bearing assembly having an input coupling having a first end in communication with said bearing assembly, and a second end with a recessed partial hemisphere with a slot disposed therein; a first torque and thrust transfer coupling having a first end with partial hemisphere with a tab disposed thereon, and a second end with partial hemisphere with a tab disposed thereon; a first pin connecting said input coupling second end and said first torque and thrust transfer coupling first end wherein said tab pivotally communicates with said slot; an intermediate shaft having a first end with a recessed partial hemisphere with a slot disposed therein, and a second end with a recessed partial hemisphere with a slot disposed therein; a second pin connecting said first torque and thrust transfer coupling second end and said intermediate shaft having a first end wherein said tab pivotally communicates with said slot; a second torque and thrust transfer coupling, having a first end with partial hemisphere with a tab disposed thereon, and a second end with partial hemisphere with a tab disposed thereon; a third pin connecting said intermediate shaft second end and said second torque and thrust transfer coupling said first end wherein said tab pivotally communicates with said slot; an output coupling having a first end with a recessed partial hemisphere with a slot disposed therein, and a second end in communication with said power section; and a fourth pin connecting said second torque and thrust transfer coupling second end and said output coupling first end wherein said tab pivotally communicates with said slot; a power section in communication with said transmission; a rotor catch assembly in communication with said power section; and a cross over sub-valve in communication with said rotor catch assembly.

Invention 10 may further include a mud motor wherein said first pin, said second pin, said third pin, and said fourth pin are double shear catch pins; a first grease retention sleeve covering said first torque and thrust transfer coupling; a second grease retention sleeve covering said second torque and thrust transfer coupling.

It is still also contemplated that invention 10 may include a transmission for a motor comprising an input coupling having a first end, a second end with a recessed partial hemisphere with a slot disposed therein, and a diameter; a first torque and thrust transfer coupling having a first end with partial hemisphere with a tab disposed thereon, a second end with partial hemisphere with a tab disposed thereon, and a diameter; a first pin connecting said input coupling second end and said first torque and thrust transfer coupling first end wherein said tab pivotally communicates with said slot; an intermediate shaft having a first end with a recessed partial hemisphere with a slot disposed therein, a second end with a recessed partial hemisphere with a slot disposed therein, and a diameter; a second pin connecting said first torque and thrust transfer coupling second end and said intermediate shaft having a first end wherein said tab pivotally communicates with said slot; a second torque and thrust transfer coupling, having a first end with partial hemisphere with a tab disposed thereon, a second end with partial hemisphere with a tab disposed thereon, and a diameter; a third pin connecting said intermediate shaft second end and said second torque and thrust transfer coupling said first end wherein said tab pivotally communicates with said slot; an output coupling having a first end with a recessed partial hemisphere with a slot disposed therein, a second end, and a diameter; and a fourth pin connecting said second torque and thrust transfer coupling second end and said output coupling first end wherein said tab pivotally communicates with said slot.

Invention 10 may still further include a transmission for a motor wherein said first pin, said second pin, said third pin, and said fourth pin are double shear catch pins; a first grease retention sleeve covering said first torque and thrust transfer coupling; a second grease retention sleeve covering said second torque and thrust transfer coupling.

Changes may be made in the combinations, operations, and arrangements of the various parts and elements described herein without departing from the spirit and scope of the invention. Furthermore, names, titles, headings and general division of the aforementioned are provided for convenience and therefore, should not be considered limiting.

What is claimed is:

1. A mud motor comprising:
   a bearing assembly;
   a transmission in communication with said bearing assembly having:
   an input coupling having a first end in communication with a power section and a second end with an input coupling recessed partial hemisphere with an input coupling slot disposed therein;
   a first torque and thrust transfer coupling having a first end with a first torque and thrust transfer coupling first partial hemisphere with a first torque and thrust transfer coupling first tab disposed thereon and a second end with a first torque and thrust transfer coupling second partial hemisphere with a first torque and thrust transfer coupling second tab disposed thereon;
   a first pin connecting said input coupling second end and said first torque and thrust transfer coupling first end wherein said first torque and thrust transfer coupling first tab pivotally communicates with said input coupling slot;
   an intermediate shaft having a first end with a first intermediate shaft recessed partial hemisphere with a first intermediate shaft slot disposed therein and a second end with a second intermediate shaft recessed partial hemisphere with a second intermediate shaft slot disposed therein;
   a second pin connecting said first torque and thrust transfer coupling second end and said intermediate shaft first end wherein said first torque and thrust transfer coupling second tab pivotally communicates with said first intermediate shaft slot;

a second torque and thrust transfer coupling, having a first end with a first second torque and thrust transfer coupling partial hemisphere with a first second torque and thrust transfer coupling tab disposed thereon and a second end with a second second torque and thrust transfer coupling partial hemisphere with a second second torque and thrust transfer coupling tab disposed thereon;

a third pin connecting said intermediate shaft second end and said second torque and thrust transfer coupling first end wherein said tab pivotally communicates with said second intermediate shaft slot;

an output coupling having a first end with an output coupling recessed partial hemisphere with an output coupling slot disposed therein and a second end in communication with said bearing assembly; and a fourth pin connecting said second torque and thrust transfer coupling second end and said output coupling first end wherein said second torque and thrust transfer coupling second end tab pivotally communicates with said output coupling slot;

said power section in communication with said transmission;

a rotor catch assembly in communication with said power section; and a cross over sub-valve in communication with said rotor catch assembly.

2. The mud motor of claim 1 wherein said first pin, said second pin, said third pin, and said fourth pin are double shear catch pins.

3. The mud motor of claim 1 further comprising a first grease retention sleeve covering said first torque and thrust transfer coupling.

4. The mud motor of claim 1 further comprising a second grease retention sleeve covering said second torque and thrust transfer coupling.

5. The mud motor of claim 1 further comprising wear resistant material applied to said input coupling, said first torque and thrust transfer coupling, said intermediate shaft, said second torque and thrust transfer coupling, and said output coupling.

6. A transmission for a motor comprising:

an input coupling having a first end in communication with a power section and a second end with an input coupling recessed partial hemisphere with an input coupling slot disposed therein;

a first torque and thrust transfer coupling having a first end with a first torque and thrust transfer coupling first partial hemisphere with a first torque and thrust transfer coupling first tab disposed thereon and a second end with a first torque and thrust transfer coupling second partial hemisphere with a first torque and thrust transfer coupling second tab disposed thereon;

a first pin connecting said input coupling second end and said first torque and thrust transfer coupling first end wherein said first torque and thrust transfer coupling first tab pivotally communicates with said input coupling slot;

an intermediate shaft having a first end with a first intermediate shaft recessed partial hemisphere with a first intermediate shaft slot disposed therein and a second end with a second intermediate shaft recessed partial hemisphere with a second intermediate shaft slot disposed therein;

a second pin connecting said first torque and thrust transfer coupling second end and said intermediate shaft first end wherein said first torque and thrust transfer coupling second tab pivotally communicates with said first intermediate shaft slot;

a second torque and thrust transfer coupling, having a first end with a first second torque and thrust transfer coupling partial hemisphere with a first second torque and thrust transfer coupling tab disposed thereon and a second end with a second second torque and thrust transfer coupling partial hemisphere with a second second torque and thrust transfer coupling tab disposed thereon;

a third pin connecting said intermediate shaft second end and said second torque and thrust transfer coupling first end wherein said tab pivotally communicates with said second intermediate shaft slot;

an output coupling having a first end with an output coupling recessed partial hemisphere with an output coupling slot disposed therein and a second end; and a fourth pin connecting said second torque and thrust transfer coupling second end and said output coupling first end wherein said second torque and thrust transfer coupling second end tab pivotally communicates with said output coupling slot.

7. The transmission for a motor of claim 6 wherein said first pin, said second pin, said third pin, and said fourth pin are double shear catch pins.

8. The transmission for a motor of claim 6 further comprising a first grease retention sleeve covering said first torque and thrust transfer coupling.

9. The transmission for a motor of claim 6 further comprising a second grease retention sleeve covering said second torque and thrust transfer coupling.

10. The transmission for a motor of claim 6 further comprising wear resistant material applied to said input coupling, said first torque and thrust transfer coupling, said intermediate shaft, said second torque and thrust transfer coupling, and said output coupling.

* * * * *